(12) United States Patent
Shirouzu et al.

(10) Patent No.: US 11,370,398 B2
(45) Date of Patent: Jun. 28, 2022

(54) MOVER AND METHOD FOR CONTROLLING THE MOVER

(71) Applicant: Panasonic Intellectual Property Management Co., Ltd., Osaka (JP)

(72) Inventors: Hiroshi Shirouzu, Shiga (JP); Tohru Nakamura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 697 days.

(21) Appl. No.: 16/237,846

(22) Filed: Jan. 2, 2019

(65) Prior Publication Data

US 2019/0225195 A1 Jul. 25, 2019

(30) Foreign Application Priority Data

Jan. 23, 2018 (JP) .............................. JP2018-009202
Jan. 23, 2018 (JP) .............................. JP2018-009203

(51) Int. Cl.
 *B60T 1/14* (2006.01)
 *B62D 33/10* (2006.01)
 *B62D 33/02* (2006.01)

(52) U.S. Cl.
 CPC ............... *B60T 1/14* (2013.01); *B62D 33/02* (2013.01); *B62D 33/10* (2013.01)

(58) Field of Classification Search
 CPC .. B60T 1/14; B60T 1/12; B62D 33/02; B62D 33/10

(Continued)

(56) References Cited

U.S. PATENT DOCUMENTS 6,125,972 A * 10/2000 French .................. B62B 5/0423
                                                            188/1.12
7,243,773 B2 * 7/2007 Bochonok ................. G07F 9/06
                                                            188/5

(Continued)

FOREIGN PATENT DOCUMENTS

DE          19745778 A1 * 4/1999 ................ B60T 1/14
DE    102014108387 A1   12/2015

(Continued)

OTHER PUBLICATIONS

Japanese Office Action issued in Japanese Patent Application No. JP2018-009202 dated Jun. 22, 2021.

(Continued)

*Primary Examiner* — Melanie Torres Williams
(74) *Attorney, Agent, or Firm* — Pearne & Gordon LLP

(57) ABSTRACT

Disclosed herein is a mover including a plurality of wheels, a body, and a friction braking mechanism. The body has a bottom surface. The body is supported by the plurality of wheels with the bottom surface facing a traveling surface, and travels on the traveling surface by turning the plurality of wheels. The friction braking mechanism applies a brake on the body with at least a portion of the bottom surface or at least a portion of a movable body brought into contact with the traveling surface by switching, while the body is traveling, a state of the movable body from a first state into a second state. The second state is a state where the movable body protrudes from the bottom surface to a different height from in the first state.

11 Claims, 14 Drawing Sheets

(58) Field of Classification Search
USPC .............................................................. 188/5
See application file for complete search history.

(56) References Cited

U.S. PATENT DOCUMENTS

| | | | |
|---|---|---|---|
| 7,578,524 B1* | 8/2009 | Matthews | B60R 25/001 |
| | | | 188/5 |
| 8,006,985 B2* | 8/2011 | Facey | B62B 5/0093 |
| | | | 280/43.14 |
| 8,666,585 B2* | 3/2014 | Bouvier | A61B 6/4405 |
| | | | 701/23 |
| 2017/0101095 A1 | 4/2017 | Nilsson et al. | |
| 2018/0141752 A1 | 5/2018 | Nakanishi et al. | |

FOREIGN PATENT DOCUMENTS

| | | |
|---|---|---|
| JP | 2003-131738 A | 5/2003 |
| JP | 2007-223457 A | 9/2007 |
| JP | 2014-144689 A | 8/2014 |
| JP | 2015-516918 A | 6/2015 |
| WO | 2016/181627 A1 | 11/2016 |

OTHER PUBLICATIONS

Japanese Office Action issued in Japanese Patent Application No. JP2018-009203 dated Jun. 22, 2021.
Chinese Office Action issued in Chinese Patent Application No. 201910051454.4 dated Jan. 29, 2022.

* cited by examiner

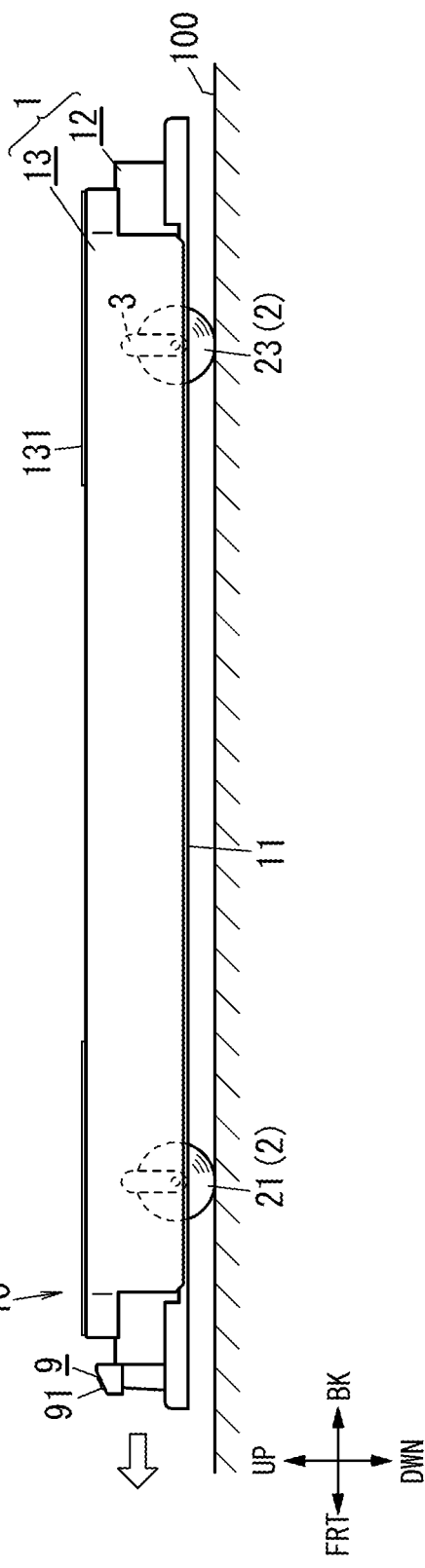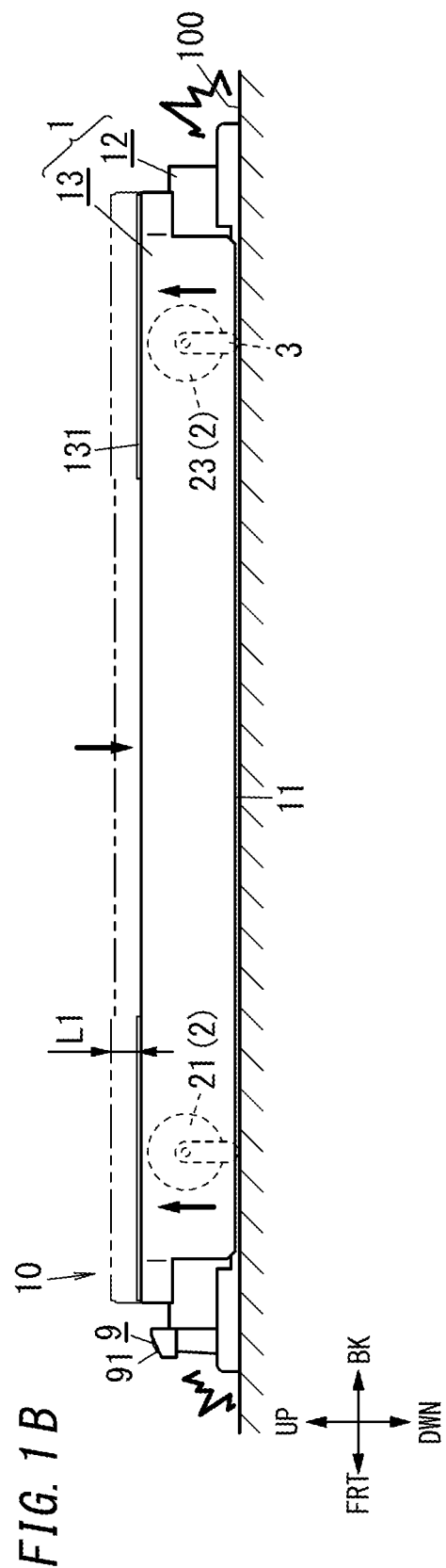

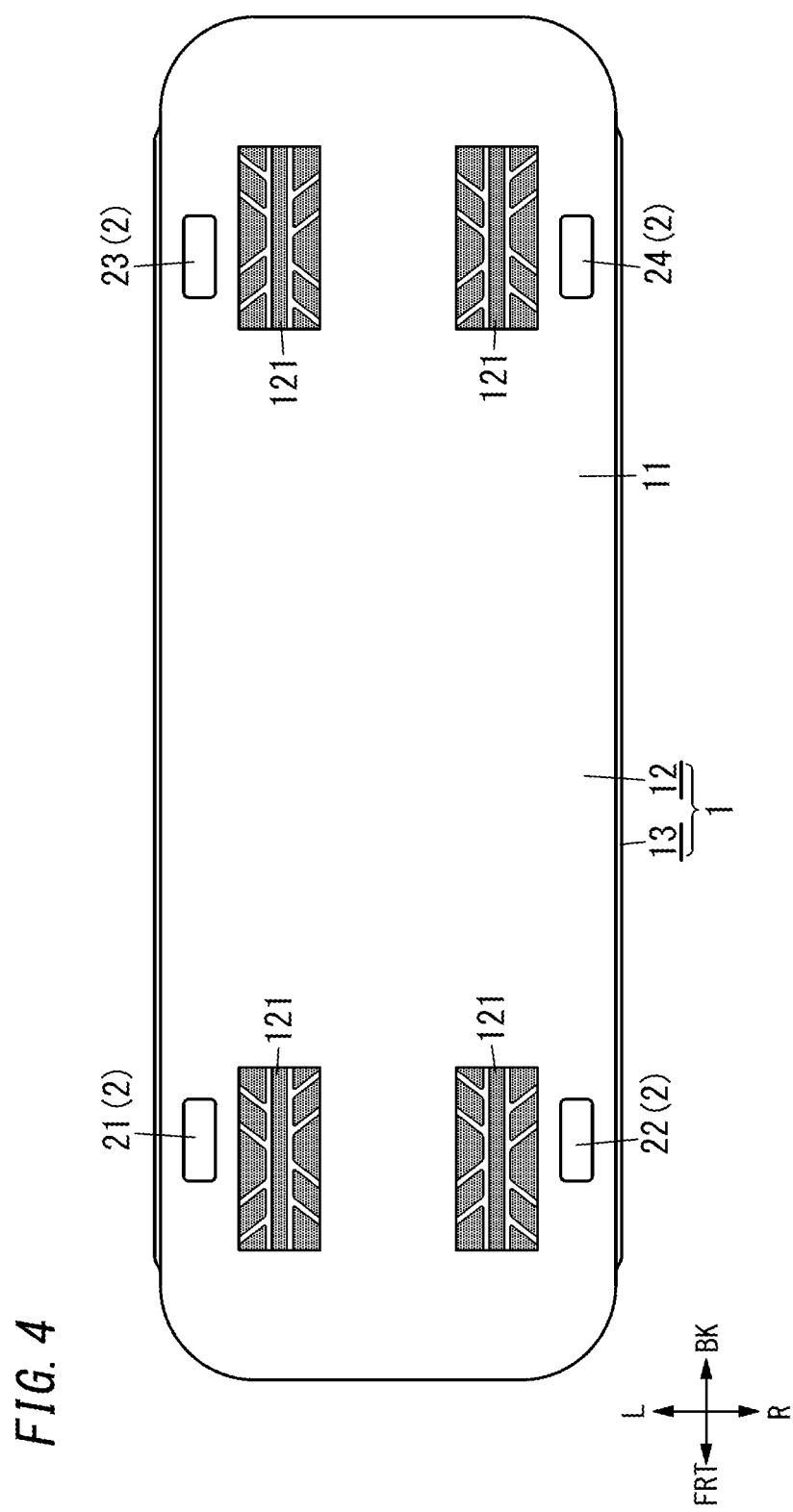

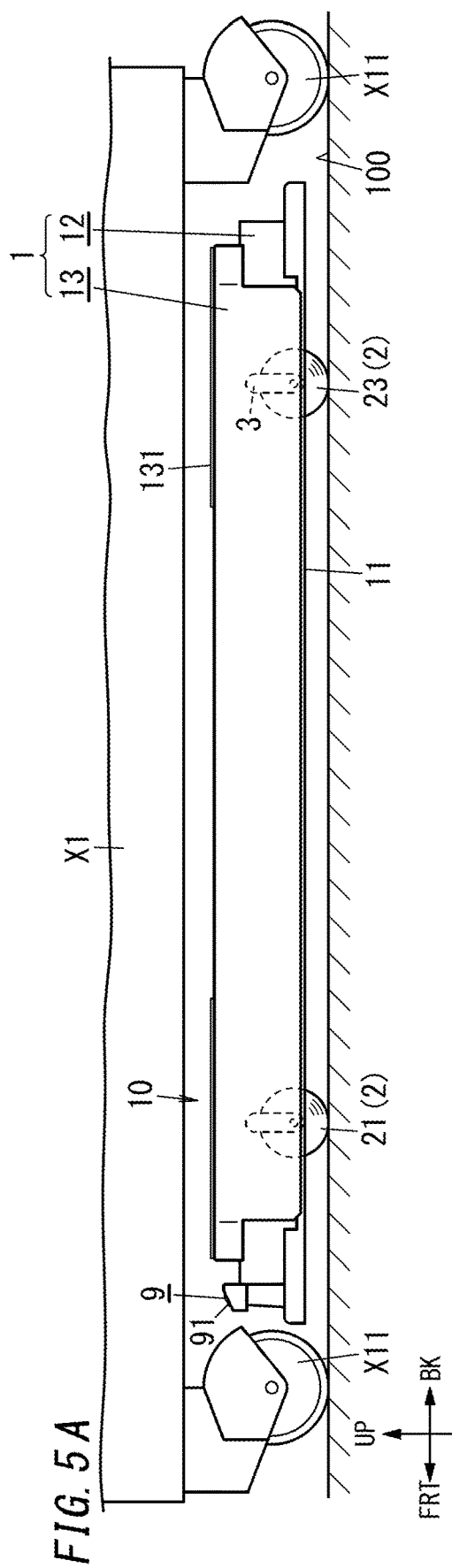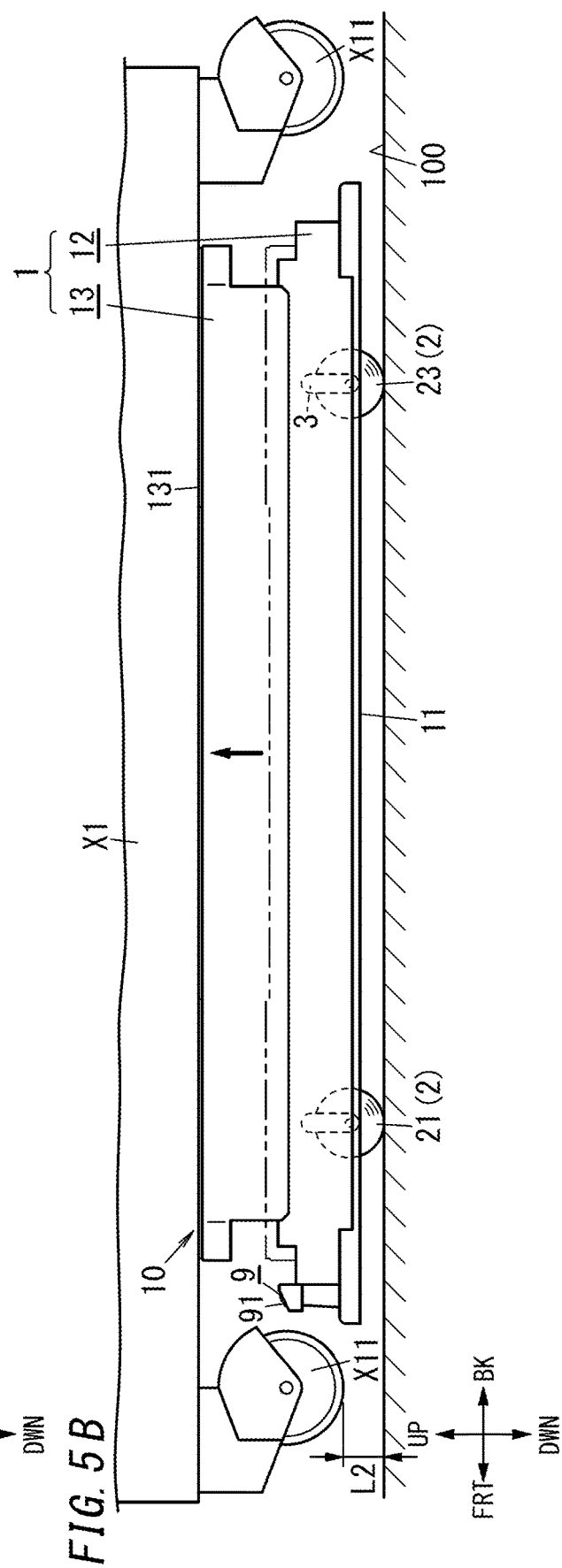

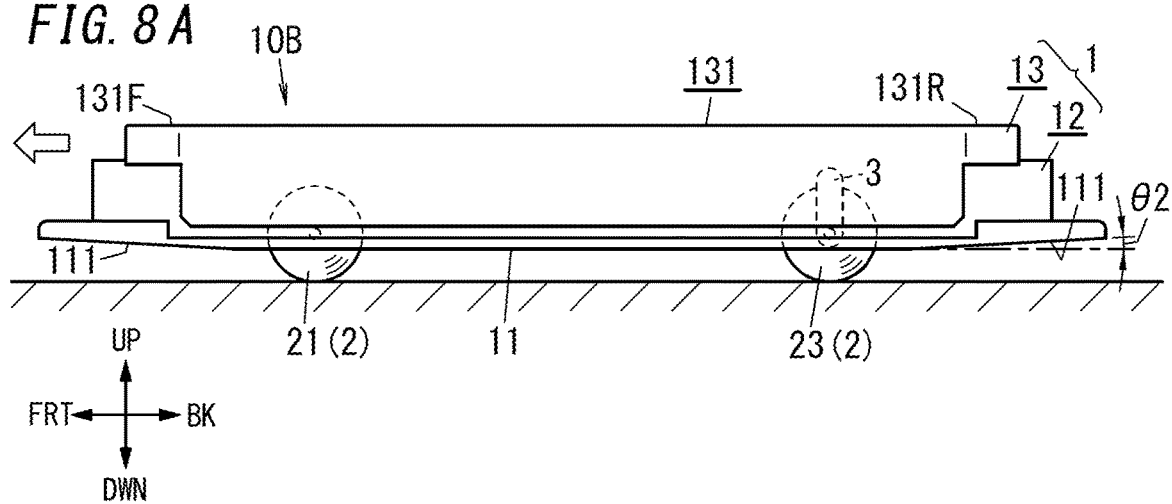
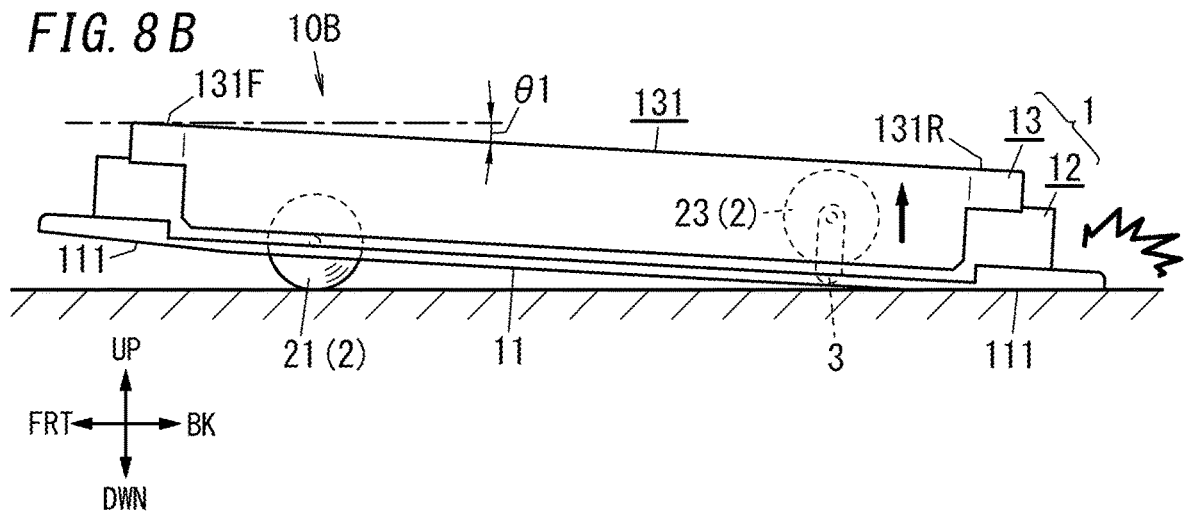

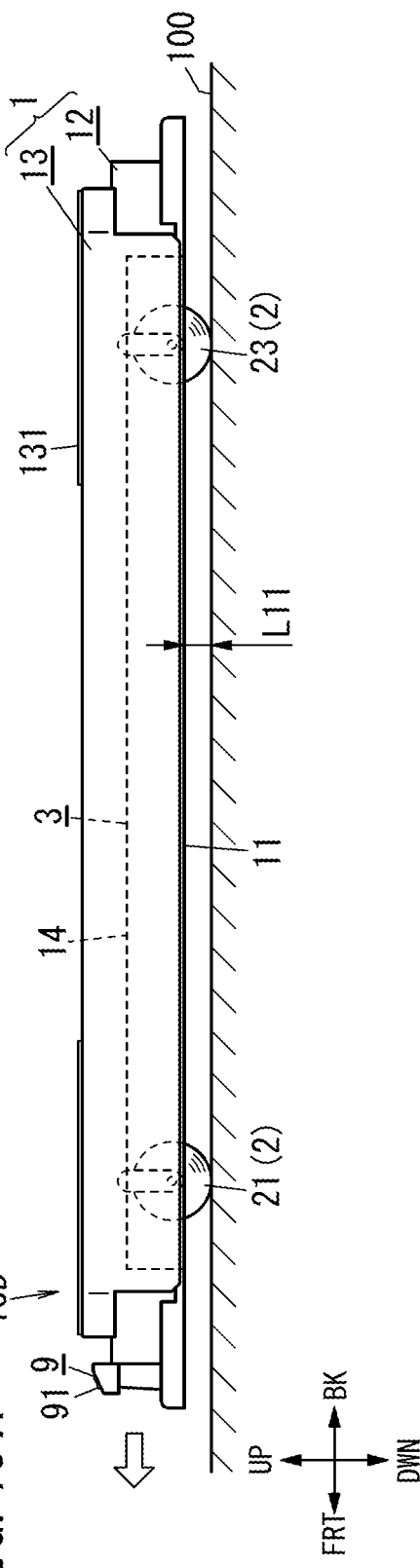
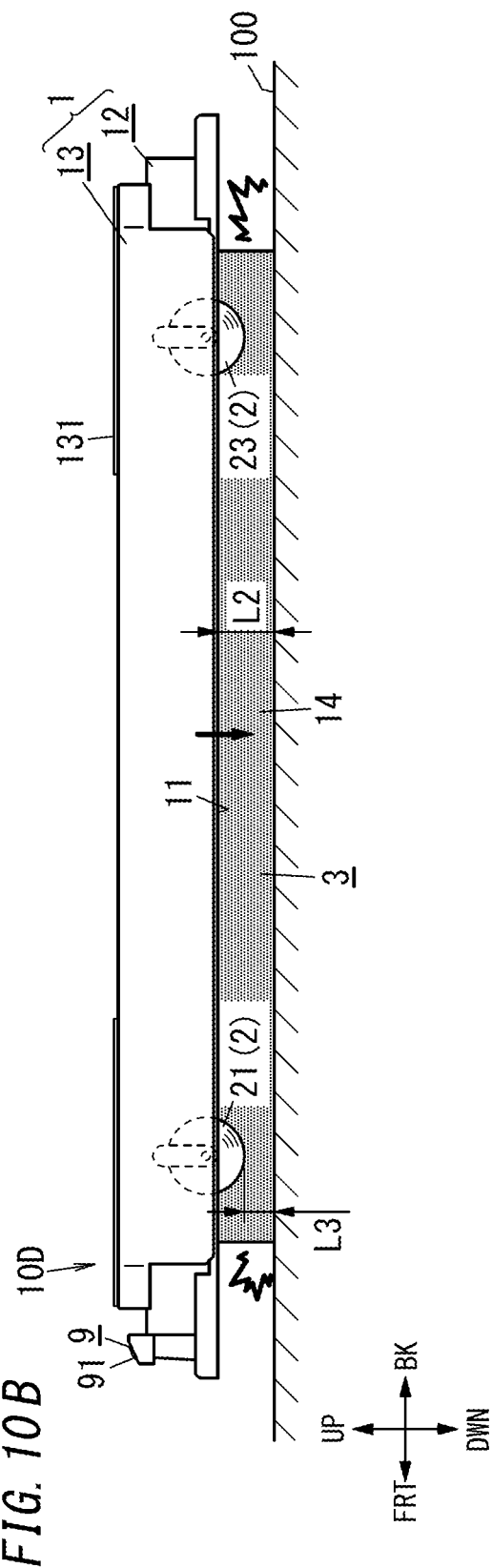

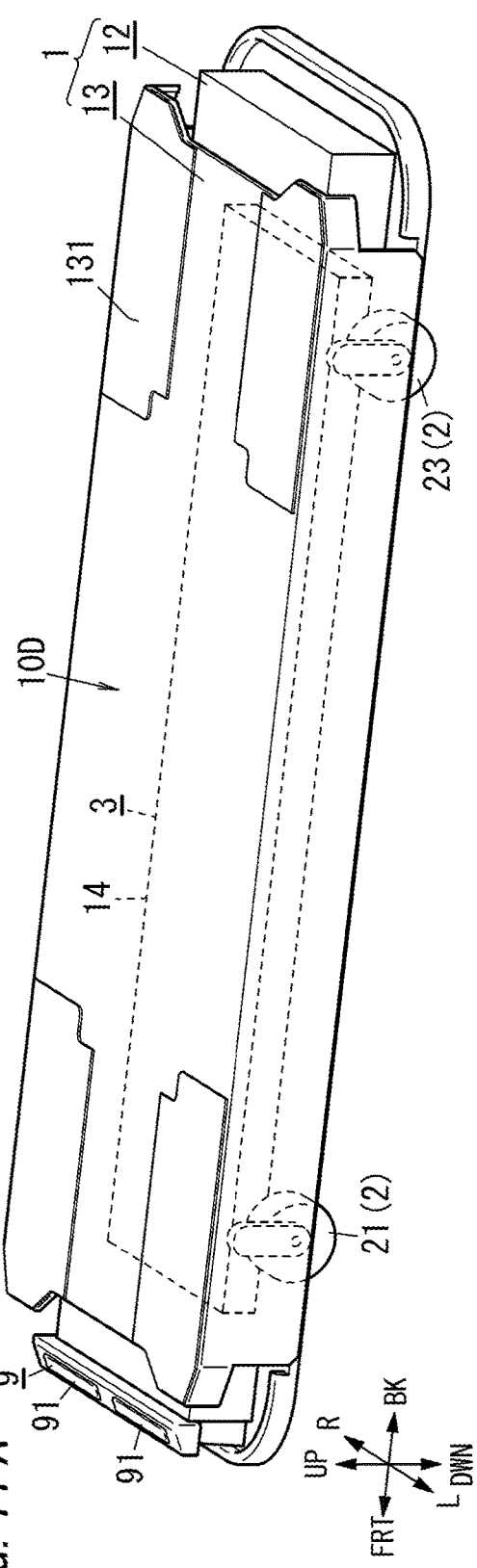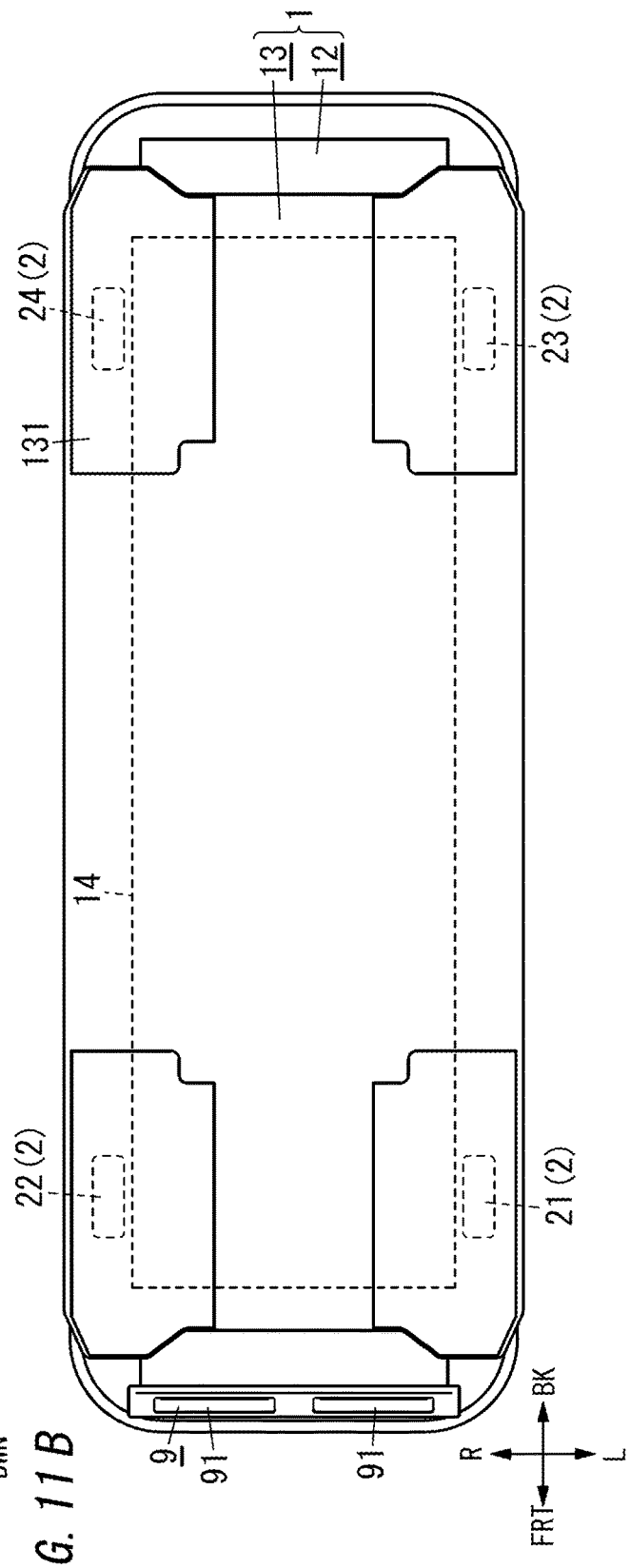

MOVER AND METHOD FOR CONTROLLING THE MOVER

CROSS-REFERENCE TO RELATED APPLICATION

This application claims the benefit of foreign priority to Japanese Patent Application No. 2018-9202 filed on Jan. 23, 2018 and Japanese Patent Application No. 2018-9203 filed on Jan. 23, 2018, which are assigned to the assignee of the present application and the entire contents of which are hereby incorporated by reference for all purposes.

TECHNICAL FIELD

The present disclosure generally relates to a mover and a method for controlling the mover, and more particularly relates to a mover configured to travel on a traveling surface on a plurality of wheels and a method for controlling such a mover.

BACKGROUND ART

D1 (JP 2003-131738 A) discloses an emergency stop system for load movers. In that emergency stop system, a mover (load mover or burden carrier) includes an emergency stop mechanism. The emergency stop mechanism performs an emergency stop operation on detecting either the presence of, or contact with, an emergency stop signboard embedded at a predetermined location ahead of the mover in its traveling direction. The emergency stop mechanism brings the mover to a stop by applying a hydraulic brake or any other type of brake on wheels (including front and rear wheels) at the time of an emergency stop operation.

The mover with the configuration disclosed in D1, however, may have a longer braking distance in a situation where the road surface is slippery for its wheels or in a situation where some abnormality has occurred in its hydraulic brake, for example.

SUMMARY

The present disclosure provides a mover with the ability to shorten its braking distance and a method for controlling such a mover.

A mover according to an aspect of the present disclosure includes a plurality of wheels, a body, and a friction braking mechanism. The body has a bottom surface. The body is supported by the plurality of wheels with the bottom surface facing a traveling surface and configured to travel on the traveling surface by turning the plurality of wheels. The friction braking mechanism is configured to apply a brake on the body with either at least a portion of the bottom surface or at least a portion of a movable body brought into contact with the traveling surface by switching, while the body is traveling, a state of the movable body from a first state into a second state. The movable body in the second state protrudes from the bottom surface to a different height from in the first state.

A method for controlling a mover according to another aspect of the present disclosure includes applying a brake on a body with at least a portion of a bottom surface brought into contact with a traveling surface by switching, while the body is traveling, a state of a movable wheel from a first state into a second state. The first state is a state where the movable wheel protrudes from the bottom surface. The second state is a state where the movable wheel protrudes to a lesser protrusion height with respect to the bottom surface than in the first state. The mover includes a plurality of wheels and the body. The plurality of wheels includes the at least one movable wheel. The body has the bottom surface. The body is supported by the plurality of wheels with the bottom surface facing the traveling surface, and configured to travel on the traveling surface by turning the plurality of wheels.

A method for controlling a mover according to still another aspect of the present disclosure includes applying a brake on a body with a movable member brought into contact with a traveling surface by switching, while the body is traveling, a state of the movable member from a first state into a second state. The movable member protrudes from the bottom surface toward the traveling surface. The first state is a state where the movable member has a protrusion height less than a reference value. The second state is a state where the movable member has a protrusion height equal to or greater than the reference value. The reference value is represented by a height of the bottom surface as measured from the traveling surface. The mover includes a plurality of wheels and the body. The body has the bottom surface. The body is supported by the plurality of wheels with the bottom surface facing the traveling surface, and configured to travel on the traveling surface by turning the plurality of wheels,

BRIEF DESCRIPTION OF DRAWINGS

FIG. 1A is a side view illustrating a mover according to a first embodiment, of which a movable wheel is in a first state;

FIG. 1B is a side view illustrating the mover, of which the movable wheel is in a second state;

FIG. 4 is a bottom view of the mover;

FIG. 5A is a side view of the mover, of which an elevator plate is located at a lower end of its movable range;

FIG. 5B is a side view of the mover, of which an elevator plate is located at an upper end of its movable range;

FIG. 8A is a side view illustrating a mover according to a first variation of the second embodiment, of which a movable wheel is in the first state;

FIG. 8B is a side view illustrating the mover, of which the movable wheel is in the second state;

FIG. 10A is a side view illustrating a mover according to a third embodiment, of which a movable member is in the first state;

FIG. 10B is a side view illustrating the mover, of which the movable member is in the second state;

FIG. 11A is a perspective view of the mover;

FIG. 11B is a plan view of the mover;

DESCRIPTION OF EMBODIMENTS

First Embodiment (1) Overview

Figure 2:
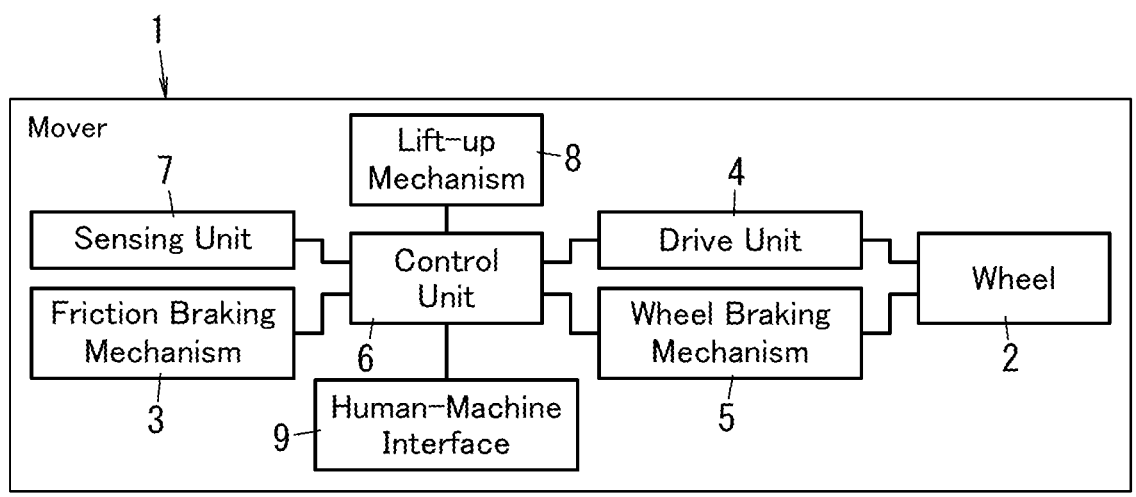
FIG. 2 is a block diagram illustrating a schematic configuration for the mover.

A mover 10 according to an exemplary embodiment is a vehicle designed to move on a traveling surface 100 on a plurality of wheels 21, 22, 23, and 24 (see FIG. 3B), as shown in FIGS. 1A and 1B. The mover 10 may be introduced into distribution centers (including parcel shipping centers), factories, offices, stores, schools, hospitals, and various other facilities and configured to travel on a traveling surface 100 such as the floor surface of a given facility. In the following description of embodiments, the mover 10 is implemented as a load mover for carrying a burden X1 (see FIG. 5A), as an example. In the following description, those wheels 21, 22, 23, and 24 will be sometimes collectively referred to as "wheels 2" unless there is a special need to distinguish those wheels 21, 22, 23, and 24 from each other.

A mover 10 according to this embodiment includes a plurality of (e.g., four in this embodiment) wheels 2 and a body 1. The body 1 has a bottom surface 11. The body 1 is supported by the plurality of wheels 2 on the traveling surface 100 with the bottom surface 11 facing the traveling surface 100. In this state, the body 1 travels on the traveling surface 100 by turning the plurality of wheels 2. As used herein, "the body 1 travels on the traveling surface 100" refers to a situation where the body 1 moves on the traveling surface 100 while being supported by the plurality of wheels 2 on the traveling surface 100.

In this embodiment, the mover 10 further includes a friction braking mechanism 3 as shown in FIG. 2. The friction braking mechanism 3 is configured to apply a brake on the body 1 traveling. The friction braking mechanism 3 applies a brake on the body 1 by changing the relative position of at least one movable wheel, included in the plurality of wheels 2, to the body 1. As used herein, "braking" means not only stopping a movement (i.e., bringing the body 1 traveling to a stop completely) but also decreasing the velocity (i.e., decelerating) of the body 1 traveling. In this embodiment, all of the plurality of wheels 21, 22, 23, and 24 are "movable wheels."

Specifically, the mover 10 according to this embodiment includes the plurality of wheels 2, the body 1, and the friction braking mechanism 3. The body 1 has the bottom surface 11. The body 1 is supported by the plurality of wheels 2 with the bottom surface 11 facing the traveling surface 100 and travels on the traveling surface 100 by turning the plurality of wheels 2. The friction braking mechanism 3 applies a brake on the body 1 with either at least a portion of the bottom surface 11 or at least a portion of a movable body brought into contact with the traveling surface 100 by switching, while the body 1 is traveling, a state of the movable body from a first state into a second state. The second state is a state where the movable body protrudes from the bottom surface 11 to a different height from in the first state.

In this embodiment, the plurality of wheels 2 includes at least one movable wheel. The movable body is the movable wheel. The friction braking mechanism 3 applies a brake on the body 1 with at least a portion of the bottom surface 11 brought into contact with the traveling surface 100 by switching, while the body 1 is traveling, a state of the movable wheel from the first state where the movable wheel protrudes from the bottom surface 11 into the second state where the movable wheel protrudes to a lesser protrusion height with respect to the bottom surface 11 than in the first state.

More specifically, the friction braking mechanism 3 is able to switch the state of the movable wheels from the first state into the second state, and vice versa. The first state is a state where the movable wheels protrude from the bottom surface 11 of the body 1. The second state is a state where the movable wheels do not protrude from the bottom surface 11 of the body 1. That is to say, the friction braking mechanism 3 switches the state of the movable wheels from the first state into the second state, and vice versa, by moving the movable wheels relative to the body 1. The friction braking mechanism 3 switches the state of the movable wheels from the first state into the second state while the body 1 is traveling, thus bringing at least a portion of the bottom surface 11 into contact with the traveling surface 100 to apply a brake on the body 1.

Once the friction braking mechanism 3 is activated to switch the state of the movable wheels from the first state into the second state as described above, a brake is applicable on the body 1, regardless of the status of braking on the wheels 2. Therefore, even if the traveling surface 100 is slippery for the wheels 2 or if any abnormality has occurred in the wheel braking mechanism 5 (see FIG. 2) for applying a brake on the wheels 2, the mover 10 is still allowed to have a short braking distance. Thus, the mover 10 according to this embodiment contributes to shortening the braking distance of movers 10.

The friction braking mechanism 3 may be activated in order to decelerate or stop the body 1 traveling while the mover 10 is operating normally (i.e., in a steady state) or bring the body 1 to an emergency stop in case of emergency, for example.

(2) Configuration

Next, a configuration for the mover 10 according to this embodiment will be described in detail with reference to FIGS. 1A-5B. In the following description, unless otherwise stated, the direction perpendicular to the traveling surface 100 (i.e., the vertical direction) will be hereinafter referred to as an "upward/downward direction" and the mover 10 is supposed to be located "over" the traveling surface 100. Also, while the mover 10 is traveling forth, the direction in which the mover 10 goes will be hereinafter referred to as a "forward direction" and the direction that is perpendicular to the upward/downward direction and the forward/backward direction (i.e., the direction perpendicular to the paper on which FIG. 1A is drawn) will be hereinafter referred to as a "rightward/leftward direction." Thus, the upward, downward, leftward, rightward, forward, and backward directions are herein defined just as indicated by the "up," "down," "left," "right," "front," and "back" arrows in FIG. 1A and other drawings. However, these directions are only an example and should not be construed as limiting the directions in which the mover 10 is used. It should also be noted that the arrows indicating the respective directions on the drawings are shown there only for the purpose of description and insubstantial ones. Likewise, the arrows indicating the directions of movements of the body 1 and other members on the drawings are also shown there only for the purpose of description and insubstantial ones.

The mover 10 includes the body 1, the plurality of (e.g., four in this embodiment) wheels 2, and the friction braking mechanism 3, as described above. In addition, in this embodiment, the mover 10 further includes a drive unit 4, a wheel braking mechanism 5, a control unit 6, a sensing unit 7, a lift-up mechanism 8, and a human-machine interface (HMI) 9. In this embodiment, the friction braking mechanism 3, the drive unit 4, the wheel braking mechanism 5, the control unit 6, the sensing unit 7, the lift-up mechanism 8, and the human-machine interface (HMI) 9 are all built in the body 1.

The mover 10 is designed to travel autonomously on a flat traveling surface 100 such as the floor surface of a facility. In this embodiment, the mover 10 is supposed to include a storage battery and be powered by the electric energy stored in the storage battery.

In this embodiment, the mover 10 is implemented as a "burden carrier" for carrying the burden X1 as described above. Thus, the mover 10 travels on the traveling surface 100 with the body 1 loaded with the burden X1. This allows the mover 10 to carry the burden X1 put at a certain place inside the facility to somewhere else inside the facility.

The body 1 is configured in the shape of a rectangular parallelepiped, of which the dimension measured in the forward/backward direction (i.e., its length) is greater than its dimension measured in the rightward/leftward direction (i.e., its width) and of which the dimension measured in the upward/downward direction (i.e., its height) is smaller than its length or its width. As will be described in detail later, in this embodiment, the burden X1 is loaded onto the body 1 by slipping the body 1 into the space under the burden X1 to lift the burden X1 upward. That is why the height of the body 1 is designed to be sufficiently smaller than the width thereof so as to allow the body 1 to be slipped into the space under the burden X1.

The body 1 includes a vehicle body 12 and an elevator plate 13. In this embodiment, the body 1 is made of a metallic material. However, this is only an example and should not be construed as limiting. Alternatively, the body 1 may also be made of a resin, for example.

Figure 3A:
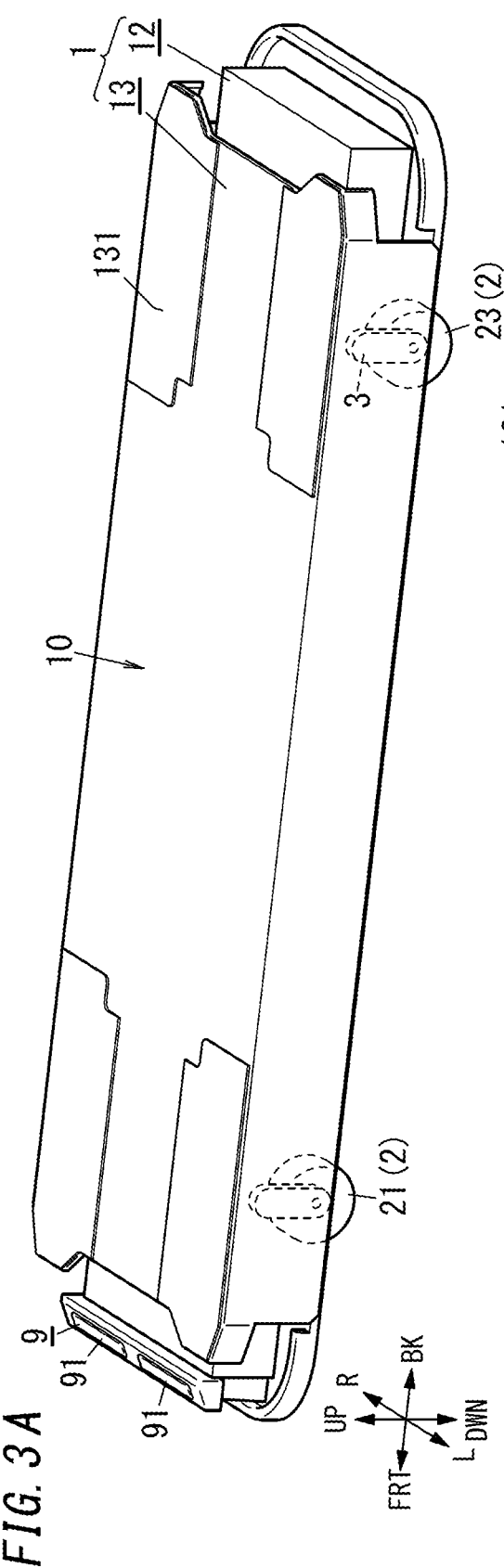
FIG. 3A is a perspective view of the mover.
Figure 3B:
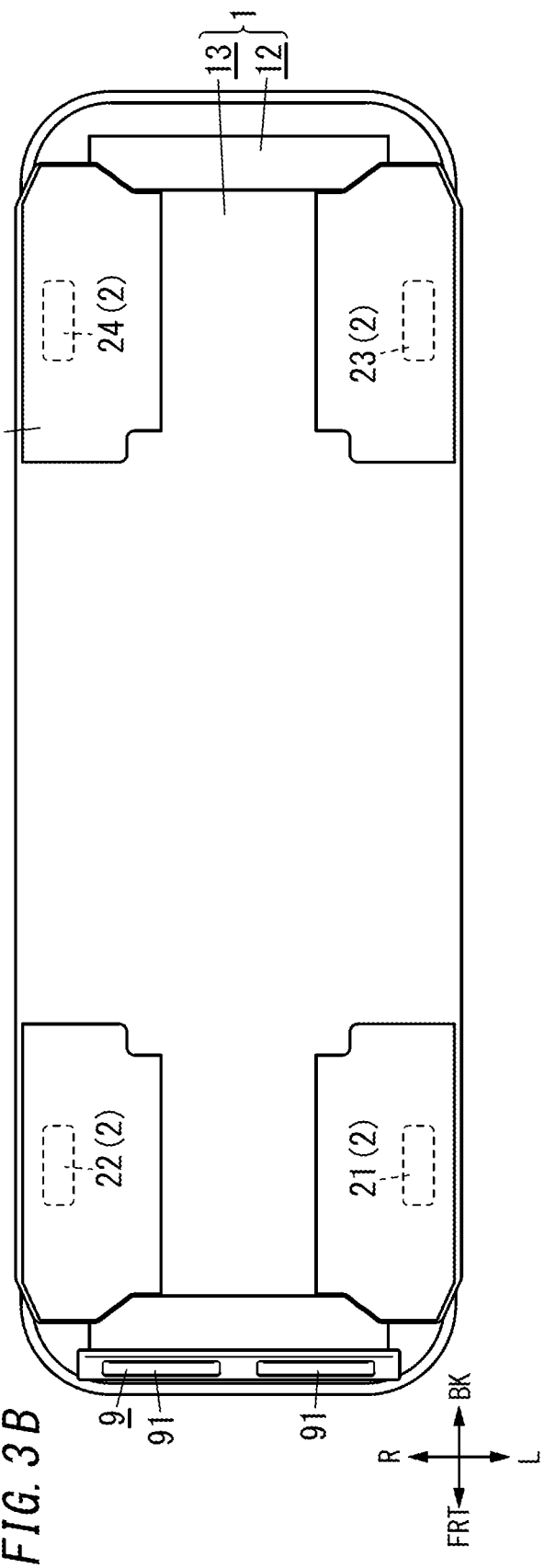
FIG. 3B is a plan view of the mover.

The vehicle body 1 is supported on the traveling surface 100 by the plurality of wheels 2. In this embodiment, the plurality of wheels 2 are arranged at four corners of the vehicle body 12 in a plan view as shown in FIGS. 3A and 3B. The lower surface of the vehicle body 1 defines the bottom surface 11 of the body 1. Thus, with all of these wheels 2 protruding from the bottom surface 11, the vehicle body 12 is supported at the four corners with its lower surface (i.e., the bottom surface 11) facing the traveling surface. In this embodiment, the wheels 21 and 22, out of the four wheels 21, 22, 23, and 24, are "front wheels" arranged in a front portion of the vehicle body 1, and the other two wheels 23 and 24 are "rear wheels" arranged in a rear portion of the vehicle body 12.

In the mover 10 of this exemplary embodiment, the body 1 includes a frictional resistance portion 121, which forms at least part of the bottom surface 11 (i.e., the lower surface of the vehicle body 12) as shown in FIG. 4. In this embodiment, a plurality of (e.g., four) frictional resistance portions 121 are provided. Each of these frictional resistance portions 121 is arranged between a centerline drawn to pass through the middle of the width of the bottom surface 11 and an associated one of the wheels 2. The frictional resistance portions 121 have a greater coefficient of friction with respect to the traveling surface 100 than any portion, other than the frictional resistance portions 121, of the bottom surface 11 of the body 1 does. In this embodiment, the frictional resistance portions 121 are implemented as sheets of synthetic rubber attached to the bottom surface 11. Such frictional resistance portions 121 have a greater coefficient of friction with respect to the traveling surface 100 than the bottom surface 11 of the body 1 does. Furthermore, in this embodiment, grooves with a predetermined pattern are cut on the surface of each frictional resistance portion 121. These grooves suitably have, just like grooves on car tires (i.e., a so-called "tread pattern"), the function of increasing the degree of close contact between the frictional resistance portion 121 and the traveling surface 100 by draining water from the gap between the surface of the frictional resistance portion 121 and the traveling surface 100.

The elevator plate 13 is arranged over the vehicle body 12 so as to cover the upper surface of the vehicle body 12 at least partially. In this embodiment, the elevator plate 13 covers the upper surface of the vehicle body 12 almost entirely but a front end portion and a rear end portion of the vehicle body 12. The upper surface of the elevator plate 13 defines a load platform 131 to be loaded with the burden X1. That is to say, when carried by the mover 10, the burden X1 is placed onto the upper surface (i.e., the load platform 131) of the elevator plate 13. In other words, the body 1 includes the load platform 131 for placing the burden X1 thereon. In this embodiment, four corner portions of the load platform 131 are slightly raised with respect to the rest (such as a middle portion) of the load platform 131. Furthermore, the four corner portions of the load platform 131 are given a greater coefficient of friction than the rest of the load platform 131 by being subjected to anti-slip treatment. This reduces the chances of the burden X1 placed on the load platform 131 slipping on the load platform 131.

In this embodiment, the elevator plate 13 is configured to be elevated and lowered by the lift-up mechanism 8 with respect to the vehicle body 12. Thus, elevating the elevator plate 13 with the body 1 slipped into the space under the burden X1 allows the burden X1 to be lifted by the elevator plate 13. Conversely, lowering the elevator plate 13 with the burden X1 lifted by the elevator plate 13 allows the burden X1 to be unloaded from the elevator plate 13.

The respective wheels 2 are configured to turn independently of each other under the driving force applied by the drive unit 4. These wheels 2 are held by the body 1 (more exactly, by the vehicle body 2) so as to turn around axles extending in the rightward/leftward direction. The surface of each wheel 2 to contact with the traveling surface 100 may be subjected to anti-slip treatment, for example, so as to have a relatively large coefficient of friction with respect to the traveling surface 100. This facilitates ensuring traction between the wheels 2 and the traveling surface 100.

In this embodiment, the wheels 21 and 22 serving as "front wheels" and the wheels 23 and 24 serving as "rear wheels" are all "drive wheels" to be driven by the drive unit 4. Also, the wheels 21 and 22 serving as "front wheels" and the wheels 23 and 24 serving as "rear wheels" are all "braking wheels" to which a brake is applied by the wheel braking mechanism 5. Furthermore, according to this embodiment, the wheels 21 and 22 serving as "front wheels" and the wheels 23 and 24 serving as "rear wheels" are all "movable wheels," of which the state is switched from the first state into the second state, and vice versa, by the friction braking mechanism 3. Driving all of these wheels 2 on an individual basis allows the body 1 to move in every direction. That is to say, the body 1 supported by the respective wheels 2 is allowed to move on the traveling surface 100 in all directions, including forward, backward, leftward, and rightward directions, by turning the plurality of wheels 2. Each of these wheels 2 may be an omnidirectional moving wheel such as an omni-wheel.

The drive unit 4 applies driving force either directly or indirectly to a drive wheel that is at least one of the plurality of wheels 2. In this embodiment, the plurality of (four) wheels 2 are all drive wheels as described above, and therefore, the drive unit 4 applies driving force to all of those wheels 2. The drive unit 4 is built in the vehicle body 12. The drive unit 4 includes an electric motor, for example, and applies the driving force generated by the electric motor to the wheels 2 indirectly via a gearbox, a belt, and other members. Alternatively, the drive unit 4 may also be configured to apply the driving force directly to the respective wheels 2 as in an in-wheel motor. The drive unit 4 drives, in response to a control signal from the control unit 6, the respective wheels 2 in rotational directions and rotational velocities specified by the control signal.

The wheel braking mechanism 5 applies a brake on a braking wheel that is at least one of the plurality of wheels 2. In this embodiment, the plurality of (four) wheels 2 are all braking wheels as described above, and therefore, the wheel braking mechanism 5 applies a brake on all of those wheels 2 by applying braking force to them. The wheel braking mechanism 5 is built in the vehicle body 12. The wheel braking mechanism 5 is implementable as any appropriate mechanism, such as a disk brake or a drum brake, for applying a brake on the wheels 2. Alternatively, the wheel braking mechanism 5 may also be configured to decrease the number of revolutions of the wheels 2, and may be implemented, for example, as a regenerative brake for absorbing the kinetic energy of the wheels 2 with the electric motor of the drive unit 4 used as a load (power generator). The wheel braking mechanism 5 controls, in response to a wheel braking signal supplied from the control unit 6, the respective wheels 2.

The control unit 6 controls the friction braking mechanism 3, the drive unit 4, the wheel braking mechanism 5, the sensing unit 7, the lift-up mechanism 8, and the human-machine interface 9. In this embodiment, the control unit 6 is implemented as a computer system including, as its major components, a processor and a memory. In other words, a computer system, including a processor and a memory, performs the function of the control unit 6 by making the processor execute a program stored in the memory. The program may be stored in advance in the memory or may also be downloaded via a telecommunications line such as the Internet or distributed after having been stored on a non-transitory storage medium such as a memory card.

The sensing unit 7 detects the behavior of the body 1, the status of braking applied on the braking wheels, and a situation surrounding the body 1, or collects any other type of data. As used herein, the "behavior" of some member refers to the operation, appearance, and other information about the member. That is to say, the behavior of the body 1 includes the operating state of the body 1 indicating that the body 1 is traveling or at a stop, the velocity of the body 1 (and a variation in its velocity), acceleration applied to the body 1, and the orientation of the body 1.

Specifically, the sensing unit 7 may include a velocity sensor, an acceleration sensor, a gyro sensor, and other types of sensors, for example, and detects the behavior of the body 1 using these sensors. The sensing unit 7 may include a camera, and a sonar sensor, a radar, a light detection and ranging sensor (LiDAR), and other types of sensors, and detects the situation surrounding the body 1 with these sensors. In addition, the sensing unit 7 detects the status of braking on the braking wheels by measuring the torque applied to the wheels 2, for example. That is to say, if the torque applied to the wheels 2 decreases steeply while a brake is being applied by the wheel braking mechanism 5, then the sensing unit 7 senses the wheels 2 locked. Optionally, the sensing unit 7 may also locate the body 1 by a global positioning system (GPS), for example. The results of sensing by the sensing unit 7 are output to the control unit 6. Note that in FIG. 1A and other drawings illustrating the appearance of the mover 10, illustration of the sensing unit 7 is omitted.

The lift-up mechanism 8 is configured to lift the burden X1 by elevating the load platform 131. In this embodiment, the load platform 131 is the upper surface of the elevator plate 13. Thus, the lift-up mechanism 8 elevates or lowers the load platform 131 by moving the elevator plate 13 up and down with respect to the vehicle body 12. The lift-up mechanism 8 moves the elevator plate 13 between a lower-limit position and an upper-limit position of the movable range of the elevator plate 13. FIG. 5A illustrates a state where the elevator plate 13 is located at the lower-limit position of its movable range. FIG. 5B illustrates a state where the elevator plate 13 is located at the upper-limit position of its movable range. The lift-up mechanism 8 is built in the body 1 so as to be located between the vehicle body 12 and the elevator plate 13.

This allows the mover 10 to slip the body 1 into the space under the burden X1 when the elevator plate 13 is located at the lower-limit position of the movable range as shown in FIG. 5A. Then, having the elevator plate 13 elevated by the lift-up mechanism 8 to the upper-limit position of the movable range with the body 1 slipped into the space under the burden X1 allows the burden X1 to be lifted by the elevator plate 13 as shown in FIG. 5B. The movable range of the elevator plate 13 may have either a constant value (fixed value) or a variable value. The lift-up mechanism 8 may include an electric motor, for example, and may be implemented as any appropriate mechanism, such as a pantograph or rack-pinion mechanism, configured to allow the elevator plate 13 to move straight up and down under the driving force generated by the electric motor.

The human-machine interface 9 is configured to display information to a human user at a prescribed time and acquire information entered by him or her. The human-machine interface 9 may include, for example, indicators 91 (see FIG. 3A), a voice output device, an operating switch, and a voice input device. Optionally, the human-machine interface 9 may also include a touchscreen panel or any other suitable user interface device configured to allow the user to enter and display information into/on the device. The indicators 91 are arranged at the front end of the body 1 (vehicle body 12) and change their display pattern depending on the mode of operation currently performed by the body 1, which may be going forward or backward or turning to the right or to the left.

The friction braking mechanism 3 switches, while the body 1 is traveling, the state of the movable wheels from the first state into the second state, thus bringing at least a portion of the bottom surface 11 into contact with the traveling surface to apply a brake on the body 1, as described above. The first state is a state where the movable wheels protrude downward (i.e., toward the traveling surface 100) from the bottom surface 11 of the body 1 as shown in FIG.

1A. The second state is a state where the movable wheels do not protrude downward (i.e., toward the traveling surface 100) from the bottom surface 11 of the body 1 as shown in FIG. 1B. In this embodiment, the plurality of (e.g., four) wheels 2 are all movable wheels. Thus, the friction braking mechanism 3 switches the state of all of the plurality of wheels 2 from the first state into the second state, and vice versa. Switching the state of all of those wheels 2 from the first state into the second state brings the entire bottom surface 11 into contact with the traveling surface 100 to apply a brake on the body 1. The friction braking mechanism 3 switches the state of the movable wheels from the first state into the second state in response to an emergency stop signal supplied from the control unit 6. Furthermore, the friction braking mechanism 3 switches the state of the movable wheels from the second state back into the first state in response to a return signal supplied from the control unit 6.

The friction braking mechanism 3 is configured to switch the state of the movable wheels from the first state into the second state, and vice versa, by moving the movable wheels relative to the body 1 such that the movable wheels protrude or retract with respect to the bottom surface 11 of the body 1. The friction braking mechanism 3 is built in the vehicle body 12. In this embodiment, in the second state where the movable wheels do not protrude from the bottom surface 11, the movable wheels are retracted in the body 1. Specifically, the bottom surface 11 has holes, through which the plurality of (four) wheels 2, serving as movable wheels, are allowed to protrude or retract with respect to the bottom surface 11. The friction braking mechanism 3 includes an electric motor, for example, and may be implemented as any appropriate mechanism, such as a pantograph or rack-pinion mechanism, configured to allow the plurality of (e.g., four) wheels 2, serving as movable wheels, to move straight up and down under the driving force generated by the electric motor.

That is to say, when the movable wheels are in the first state where the wheels protrude from the bottom surface 11 as shown in FIG. 1A, the body 1 is supported by the plurality of wheels 2 and a gap is left between the bottom surface 11 of the body 1 and the traveling surface 100 (i.e., the bottom surface 11 is out of contact with the traveling surface 100). On the other hand, when the movable wheels are in the second state where the wheels do not protrude from the bottom surface 11 as shown in FIG. 1B, the body 1 is lowered relative to the movable wheels to bring at least a portion of the bottom surface 11 (e.g., the entire bottom surface 11 in this embodiment) into contact with the traveling surface 100. Thus, when the state is switched from the first state into the second state while the body 1 is traveling, friction is caused between at least a portion of the bottom surface 11 (e.g., the entire bottom surface 11 in this embodiment) and the traveling surface 100, thus applying a brake on the body 1.

Also, in this embodiment, the friction braking mechanism 3 switches the state of the movable wheels from the first state into the second state when the drive unit 4 is deactivated. As used herein, the phrase "the drive unit 4 is deactivated" means that the drive unit 4 has become unable to transmit the driving force to the wheels 2, i.e., the driving force is cut off. That is to say, in case of emergency, such as when the supply of power from the storage battery to the drive unit 4 is cut off or when a failure has occurred in the control unit 6, the friction braking mechanism 3 functions as an emergency brake to put a brake on the mover 10. Specifically, the friction braking mechanism 3 makes an actuator such as a solenoid or electromagnetic valve maintain the movable wheels in the first state while power is supplied from the storage battery. On the other hand, when the supply of the power from the storage battery is cut off, the actuator of the friction braking mechanism 3 is no longer able to maintain the movable wheels in the first state. Then, the body 1 lowers itself relative to the movable wheels due to its own weight to switch the state of the movable wheels into the second state. This allows the friction braking mechanism 3 to constitute a failsafe braking system to apply a brake on the mover 10 at least in case of emergency.

Optionally, the mover 10 may further include any other appropriate component such as a charger circuit for the storage battery as needed.

(3) Operation

Next, it will be described how the mover 10 according to this embodiment operates.

(3.1) Basic Operation

In a steady state, the mover 10 travels autonomously on the traveling surface 100 as its basic operation. In this case, the mover 10 has the situation surrounding the body 1 detected by the sensing unit 7 and makes the control unit 6 determine a movement route based on the situation surrounding the body 1. Then, the mover 10 makes the control unit 6 control the drive unit 4 in accordance with the movement route thus determined, thus driving the wheels 2 and traveling autonomously.

While the mover 10 is traveling autonomously, the body 1 supported by the plurality of wheels 2 moves on the traveling surface 100 by turning the plurality of wheels 2. Also, when the mover 10 needs to decelerate or stop while traveling, the mover 10 activates the wheel braking mechanism 5 to apply a brake on the plurality of wheels 2 and decelerate or stop the body 1.

Furthermore, the mover 10 according to this embodiment also serves as a burden carrier for carrying the burden X1 by traveling on the traveling surface 100 with the burden X1 placed on the body 1. In loading the body 1 with the burden X1, first, the mover 10 slips the body 1 into the space under the burden X1 when the elevator plate 13 is located at the lower-limit position of the movable range as shown in FIG. 5A. In this state, the lift-up mechanism 8 elevates the elevator plate 13 to the upper-limit position of the movable range, thus having the burden X1 lifted by the upper surface (i.e., the load platform 131) of the elevator plate 13 as shown in FIG. 5B. This allows the load platform 131 of the body 1 to be loaded with the burden X1a.

In this case, the distance traveled upward by the elevator plate 13 when the lift-up mechanism 8 lifts the burden X1 from its position when the load platform 131 was in contact with the lower surface of the burden X1 corresponds to the distance L2 traveled upward by the burden X1 lifted by the lift-up mechanism 8 (see FIG. 5B). As used herein, the "distance L2 traveled upward by the burden X1" refers to the vertical distance that the burden X1 lifted by the elevator plate 13 goes when the elevator plate 13 is elevated by the lift-up mechanism 8. That is to say, the distance L2 traveled upward by the burden X1 is represented by the height, as measured from the traveling surface 100, of the bottom of the burden X1 that was in contact with the traveling surface 100 when the burden X1 was unloaded from the mover 10 and that is now located over, and out of contact with, the traveling surface 100 when the burden X1 has been lifted by the lift-up mechanism 8. For example, if the given burden X1 is a burden X1 with casters X11 as shown in FIG. 5B, the height, as measured from the traveling surface 100, of the bottom of the casters X11 corresponds to the distance L2 traveled upward by the burden X1 lifted by the lift-up mechanism 8.

(3.2) Emergency Stop Operation

Next, it will be described with reference to the flowchart of FIG. 6 how the mover 10 performs an emergency stop operation, that is, an operation of activating the friction braking mechanism 3 to bring the body 1 to an emergency stop while the body 1 is traveling.

First of all, on the supposition that the driving force supplied from the drive unit 4 is not cut off (i.e., the drive unit 4 is not deactivated) while the body 1 is traveling (i.e., if the answer is NO in Step S1), the control unit 6 checks the status of activation of the wheel braking mechanism 5 (in Step S2). The control unit 6 checks the status of activation of the wheel braking mechanism 5, i.e., determines whether or not the wheel braking mechanism 5 is activated, based on whether a wheel braking signal for controlling the wheel braking mechanism 5 is asserted or negated. In this processing step, unless the wheel braking mechanism 5 is activated (i.e., unless a brake is applied on the wheels) (if the answer is NO in Step S2), the process goes back to the processing step S1.

On the other hand, if the wheel braking mechanism 5 is activated (i.e., if a brake is applied on the wheels) (if the answer is YES in Step S2), then the control unit 6 determines whether or not any of predetermined conditions is satisfied. This determination is made whether or not the braking force applied by the wheel braking mechanism 5 is sufficient. On finding the braking force applied by the wheel braking mechanism 5 to be insufficient, the control unit 6 decides that the predetermined condition be satisfied. In this embodiment, the predetermined conditions include a first condition (on which the decision is made in Step S3), a second condition (on which the decision is made in Step S4), and a third condition (on which the decision is made in Step S5).

On deciding that any one of the first, second, and third conditions, constituting the predetermined conditions, is satisfied (i.e., if the answer is YES in Step S3, S4, or S5), the control unit 6 activates the friction braking mechanism 3 (in Step S6). Once the friction braking mechanism 3 is activated, the friction braking mechanism 3 switches the state of the movable wheels from the first state into the second state (in Step S7). In other words, on finding any of the predetermined conditions satisfied while the wheel braking mechanism 5 is activated, the control unit 6 switches the state of the movable wheels from the first state into the second state by activating the friction braking mechanism 3. That is to say, on finding the braking force applied by the wheel braking mechanism 5 insufficient even though a brake is being applied on the wheels (in a situation where the answer is YES in Step S2), the control unit 6 decides that the predetermined condition be satisfied (i.e., the answer is YES in Step S3, S4, or S5), and activates the friction braking mechanism 3 (in Step S6).

When the state of the movable wheels switches from the first state into the second state in this manner, the body 1 is lowered relative to the movable wheels. In this case, the distance L1 traveled downward by the load platform 131 (see FIG. 1B) when the state of the movable wheels switches from the first state into the second state corresponds to the vertical distance that the body 1 goes downward. That is to say, the height, measured from the traveling surface 100, of the bottom surface 11 while the movable wheels are in the first state (i.e., the minimum height of the body 1 over the ground) corresponds to the distance L1 traveled downward by the load platform 131 when the state of the movable wheels switches from the first state into the second state. Switch of the state of the movable wheels from the first state into the second state brings the bottom surface 11 of the body 1 into contact with the traveling surface 100, thus causing frictional force between the bottom surface 11 of the body 1 and the traveling surface 100. This puts a brake on the body 1 and brings the body 1 to an emergency stop.

On the other hand, as soon as the driving force supplied from the drive unit 4 is cut off (i.e., as soon as the drive unit 4 is deactivated) (if the answer is YES in Step S1), the mover 10 activates the friction braking mechanism 3 immediately (in Step S6) without letting the control unit 6 make decisions about the predetermined conditions (including the first, second, and third conditions) described above.

Next, the first condition (on which the decision is made in Step S3), the second condition (on which the decision is made in Step S4), and the third condition (on which the decision is made in Step S5), included in the predetermined conditions, will be described.

The first condition is that there is no correlation between the status of activation of the wheel braking mechanism 5 and the behavior of the body 1. Thus, the first condition is that the behavior of the body 1 is presumed to be abnormal. In other words, the control unit 6 determines, based on the correlation between the status of activation of the wheel braking mechanism 5 and the behavior of the body 1, whether or not the first condition is satisfied, out of the predetermined conditions. The first condition is that the status of activation of the wheel braking mechanism 5 and the behavior of the body 1 do not have a predetermined correlation. For example, if the behavior of the body 1 is contradictory to the status of activation of the wheel braking mechanism 5 (e.g., when the behavior of the body 1 does not indicate that deceleration of the body 1 is equal to or greater than a predetermined value even though the wheel braking mechanism 5 is activated), then there is no correlation between the body's 1 behavior and the status of activation of the wheel braking mechanism 5, and therefore, the first condition is satisfied.

In short, if the braking force applied by the wheel braking mechanism 5 were sufficient, then the body 1 should behave in a particular manner according to the status of activation of the wheel braking mechanism 5 (e.g., the body 1 should have deceleration equal to or greater than a predetermined value or acceleration equal to or greater than a predetermined value should be applied to the body 1) while the wheel braking mechanism 5 is activated. For that reason, on finding no such correlation between the status of activation of the wheel braking mechanism 5 and the behavior of the body 1 (i.e., on finding the behavior of the body 1 abnormal) (i.e., if the answer is YES in Step S3), the control unit 6 decides that the first condition be satisfied. On the other hand, on finding such correlation between the status of activation of the wheel braking mechanism 5 and the behavior of the body 1 (i.e., on finding the behavior of the body 1 normal) (i.e., if the answer is NO in Step S3), the control unit 6 decides that the first condition not be satisfied. The behavior of the body 1 may be interpreted based on the result of detection by the sensing unit 7.

The second condition is that the status of braking applied on the braking wheels is abnormal (e.g., the braking wheels are locked). In other words, the control unit 6 determines, based on the status of braking on the braking wheels, whether or not the second condition is satisfied, out of the predetermined conditions. For example, if the torque applied to the plurality of (e.g., four) wheels 2 serving as braking wheels decreases steeply, then there should be some abnormality such as locking of the wheels 2, and therefore, the second condition is satisfied.

In short, if the wheels 2 are locked, then the wheels 2 will just slip on the traveling surface 100, and therefore, sufficient braking force will not be applied by the wheel braking mechanism 5. Thus, on finding the status of braking on the braking wheels abnormal (i.e., if the answer is YES in Step S4), the control unit 6 decides that the second condition be satisfied. On the other hand, on finding the status of braking on the braking wheels normal (i.e., if the answer is NO in Step S4), the control unit 6 decides that the second condition not be satisfied. The status of braking on the braking wheels may be determined based on the results of detection by the sensing unit 7.

The third condition is that the distance from a mandatory stop position to the body 1 is shorter than the braking distance of the body 1 when the wheel braking mechanism 5 is activated. In other words, the control unit 6 determines, by comparing the distance from the mandatory stop position on the traveling surface 100 to the body 1 with the braking distance of the body 1 when the wheel braking mechanism 5 is activated, whether or not the third condition is satisfied, out of the predetermined conditions. As used herein, the "mandatory stop position" refers to a position where the body 1 should be stopped in an area surrounding the body 1. For example, if there is an obstacle (such as another mover, a creature, a wall, or an ascending step) ahead of the body 1 in its traveling direction, then the mandatory stop position is located before the obstacle. On the other hand, if there is a descending step ahead of the body 1 in its traveling direction, the mandatory stop position is located before the descending step. The distance from such a mandatory stop position to the body 1 (i.e., the distance from the current location of the body 1 to the mandatory stop position) will also be hereinafter referred to as a "mandatory stop distance." As used herein, the "traveling direction" is defined by a line indicating the direction in which the body 1 is going, and may refer to both the forward and backward directions with respect to the body 1 moving.

In short, the braking force applied by the wheel braking mechanism 5 is determined to be sufficient or insufficient depending on whether or not the body 1 is able to be stopped by the wheel braking mechanism 5 before the mandatory stop position. If the body 1 is unable to stop completely before the mandatory stop position (i.e., if the mandatory stop distance is shorter than the braking distance (by the wheel braking mechanism 5), the braking force applied by the wheel braking mechanism 5 is insufficient, which means that the third condition is satisfied. Thus, on finding the mandatory stop distance shorter than the braking distance (i.e., if the answer is YES in Step S5), the control unit 6 decides that the third condition be satisfied. On the other hand, on finding the mandatory stop distance equal to or longer than the braking distance (i.e., if the answer is NO in Step S5), the control unit 6 decides that the third condition not be satisfied. The mandatory stop distance and the braking distance of the body 1 when the wheel braking mechanism 5 is activated may be determined based on the result of detection by the sensing unit 7. For example, if there is an obstacle 5.5 meters ahead of the body 1 in its traveling direction, the mandatory stop distance may be 5 meters. In that case, if the braking distance, calculated based on the velocity of the body 1 and other parameters, of the body 1 when the wheel braking mechanism 5 is activated is longer than 5 meters, decision is made that the mandatory stop distance be shorter than the braking distance (i.e., that the answer is YES in Step S5) and that the third condition be satisfied.

Figure 6:
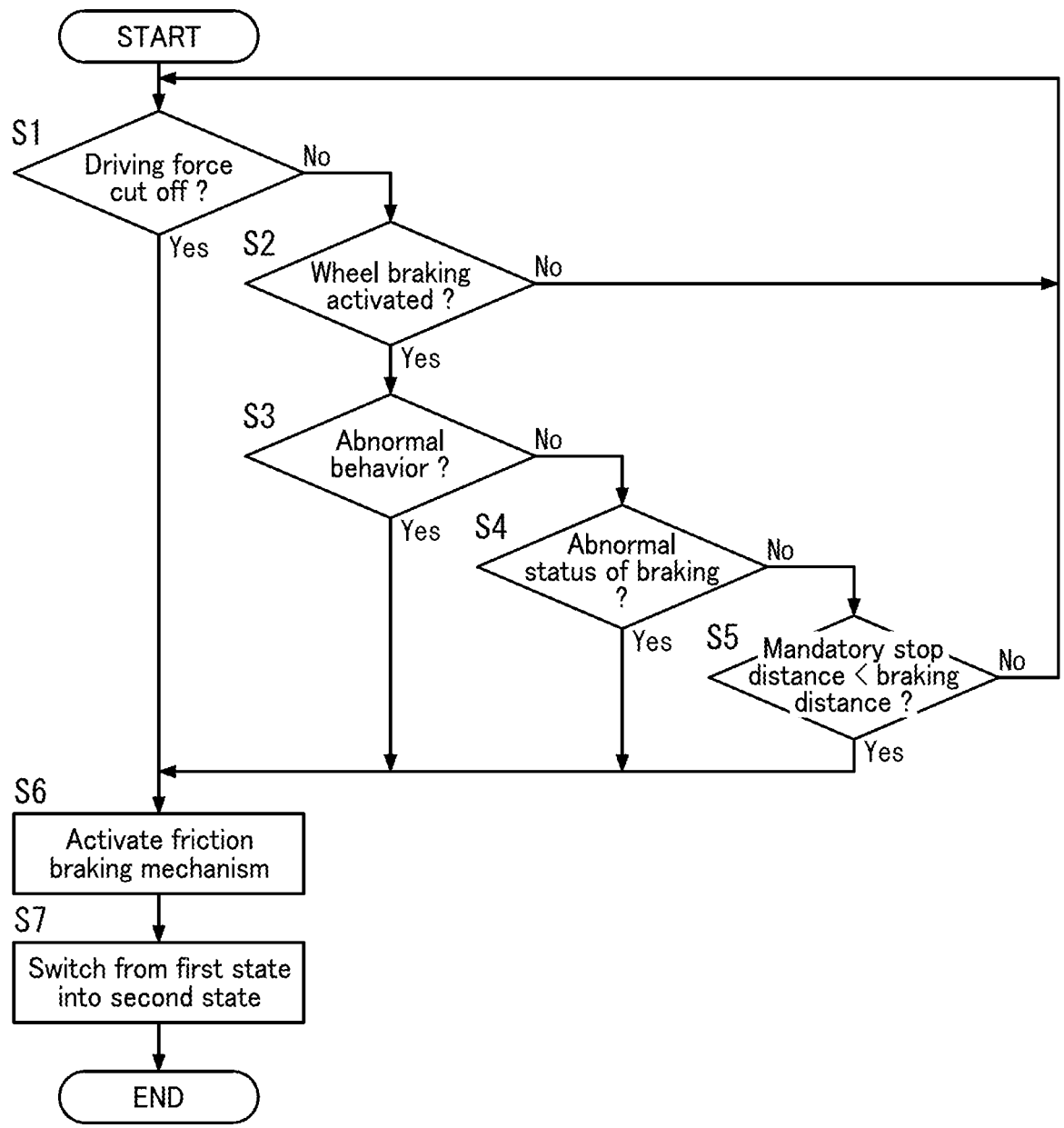
FIG. 6 is a flowchart illustrating how the mover performs an emergency stop operation.

The flowchart shown in FIG. 6 corresponds to a method for controlling the mover 10. That is to say, a method for controlling the mover 10 includes the processing step (S7) of switching, while the body 1 is traveling, the state of the movable wheels from the first state into the second state, thus bringing at least a portion of the bottom surface 11 into contact with the traveling surface 100 to apply a brake on the body 1.

Note that the order of the processing steps in the flowchart shown in FIG. 6 is only an example and may be changed appropriately. For example, the respective processing steps of determining whether or not the first, second, and third conditions are satisfied in Steps S3, S4, and S5 may be performed in a different order as appropriate. In addition, it is not essential for the mover 10 that the predetermined conditions include the first, second, and third conditions. Alternatively, the predetermined conditions may include only one or two selected from the first, second, and third conditions. Still alternatively, instead of activating the friction braking mechanism 3 when any one of the first, second, and third conditions is satisfied, the control unit 6 may activate the friction braking mechanism 3 when any two, or even all three, of the first, second, and third conditions are satisfied, for example.

The distance L1 traveled downward by the load platform 131 (see FIG. 1B) when the state of the movable wheels switches from the first state into the second state is less than the distance L2 traveled upward by the burden X1 (see FIG. 5B) lifted by the lift-up mechanism 8. That is to say, when the friction braking mechanism 3 is activated, while the mover 10 is carrying the burden X1, by an emergency stop operation to switch the state of the movable wheels from the first state into the second state, the distance L1 traveled downward by the load platform 131 is less than the distance L2 traveled upward by the burden X1.

This allows, even when the friction braking mechanism 3 is activated while the mover 10 is carrying the burden X1, the mover 10 to keep the burden X1 uplifted over the traveling surface 100. That is to say, the burden X1 being carried is elevated by the distance L2 over the traveling surface 100. That is why even if the friction braking mechanism 3 is activated to lower the load platform 131 by the distance L1 (where L1<L2), the burden X1 will not come into contact with the traveling surface 100. This reduces the chances of even the burden X1 with casters X11 continuing to move under the inertial force while the friction braking mechanism 3 is activated.

(4) Variations

The first embodiment described above is only one of various embodiments of the present disclosure, and may be readily modified, changed, replaced, or combined with any other embodiments, depending on a design choice or any other factor, without departing from a true spirit and scope of the present disclosure. Also, the same function as that of the mover 10 according to the first embodiment may be implemented as a method for controlling the mover 10, a (computer) program of controlling the mover 10, or a non-transitory storage medium that stores the program thereon. A method for controlling the mover 10 according to an aspect includes applying a brake on the body 1 with at least a portion of the bottom surface 11 brought into contact with the traveling surface 100 by switching, while the body 1 is traveling, the state of movable wheels from the first state into the second state. The mover 10 that is an object of control includes a plurality of wheels 2 including at least one movable wheel and the body 1. The body 1 has the bottom surface 11. The body 1 is supported by the plurality of wheels 2 with the bottom surface 11 facing the traveling surface 100, and configured to travel on the traveling surface 100 by turning the plurality of wheels 2. The first state is a state where the movable wheel protrudes from the bottom surface 11. The second state is a state where the movable wheel protrudes to a lesser protrusion height with respect to the bottom surface 11 than in the first state. Next, variations of the first embodiment will be enumerated one after another. Optionally, any of the variations to be described below may be adopted in combination as appropriate.

In the mover 10 according to the present disclosure, the control unit 6 and other components may include a computer system. In that case, the computer system may include, as principal hardware components, a processor and a memory. The function of the control unit 6 according to the present disclosure may be performed by making the processor execute the program stored in the memory of the computer system. The program may be stored in advance in the memory of the computer system. Alternatively, the program may also be downloaded through a telecommunications line or be distributed after having been recorded in some non-transitory storage medium such as a memory card, an optical disc, or a hard disk drive, any of which is readable for the computer system. The processor of the computer system may be made up of a single or a plurality of electronic circuits including a semiconductor integrated circuit (IC) or a largescale integrated circuit (LSI). Those electronic circuits may be integrated together on a single chip or distributed on multiple chips without limitation. Those multiple chips may be integrated together in a single device or distributed in multiple devices without limitation.

In the first embodiment described above, the mover 10 is used to carry the burden X1. However, this is only an example and should not be construed as limiting. The mover 10 may be any type of device configured to travel on the traveling surface 100 on the plurality of wheels 2. That is to say, the mover 10 is not necessarily used to carry a burden. Alternatively, the mover 10 may also be a vehicle for carrying humans (i.e., may also be a passenger vehicle). Still alternatively, the mover 10 may also be a device that moves without carrying anything such as a surveillance robot or a guide robot.

Optionally, the mover 10 may have the capability of communicating with a high-order system. Furthermore, the mover 10 does not have to be designed to travel autonomously. Alternatively, the mover 10 may also be remote-controlled in response to an operating signal received from a high-order system or a transmitter, for example.

Furthermore, the control unit 6, the sensing unit 7, and other components provided for the body 1 according to the first embodiment may also be provided for any component other than the body 1. For example, some functions of the control unit 6 and the sensing unit 7 may be performed by a high-order system with the capability of communicating with the body 1.

Furthermore, the frictional resistance portions 121 do not have to be provided for only portions of the bottom surface 11 but may cover the entire bottom surface 11 as well. The grooves cut on the surface of the frictional resistance portions 121 are not essential to the mover 10 but may be omitted as appropriate.

Furthermore, the energy that powers the respective parts of the mover 10 does not have to be electric energy. Alternatively, the respective parts of the mover 10 may also be operated by an engine or any other type of driving force such as hydraulic pressure or pneumonic pressure. Optionally, different types of energy may be used for respective parts of the mover 10. For example, the drive unit 4 may be powered by an engine and the friction braking mechanism 3 may be driven by electric energy.

Furthermore, in the first embodiment described above, the friction braking mechanism 3 is supposed to be activated when an emergency stop operation is performed to bring the body 1 to an emergency stop. However, this is only an example and should not be construed as limiting. Alternatively, when decelerating or stopping while traveling in the steady state, the mover 10 may activate the friction braking mechanism 3 either in place of, or in addition to, the wheel braking mechanism 5 to apply a brake on the body 1.

Furthermore, not all of the plurality of wheels 2 have to be drive wheels in this mover 10. For example, only the wheels 21 and 22, serving as front wheels, may be drive wheels. Likewise, not all of the plurality of wheels 2 have to be braking wheels in this mover 10, either. For example, only the wheels 21 and 22, serving as front wheels, may be braking wheels. Likewise, not all of the plurality of wheels 2 have to be movable wheels in this mover 10, either. For example, only the wheels 21 and 22, serving as front wheels, may be movable wheels. Furthermore, the drive wheels, braking wheels, and movable wheels of this mover 10 do not have to be the same set of wheels 2.

In the mover 10 according to the embodiment described above, in the second state where the movable wheels do not protrude from the bottom surface 11, the movable wheels are retracted in the body 1. However, this is only an example and should not be construed as limiting. Alternatively, the movable wheels do not have to be retracted in the body 1 in the second state. For example, adopting a configuration in which the movable wheels are flipped up to the right and left side surfaces of the body 1 allows the movable wheels to switch into the second state where the movable wheels do not protrude from the bottom surface 11, even without retracting the movable wheels in the body 1.

Furthermore, in the embodiment described above, when the power supplied from the storage battery is cut off, the friction braking mechanism 3 allows the body 1 to be lowered due to its own weight relative to the movable wheels. However, this is only an example and should not be construed as limiting. Alternatively, when the sensing unit 7 detects that the drive unit 4 has been deactivated, the friction braking mechanism 3 may be controlled by the control unit 6 to switch the state of the movable wheels from the first state into the second state. Even in such an alternative embodiment, the friction braking mechanism 3 may also be configured to switch the state of the movable wheels from the first state into the second state when the drive unit 4 is deactivated.

Second Embodiment

Figure 7A:
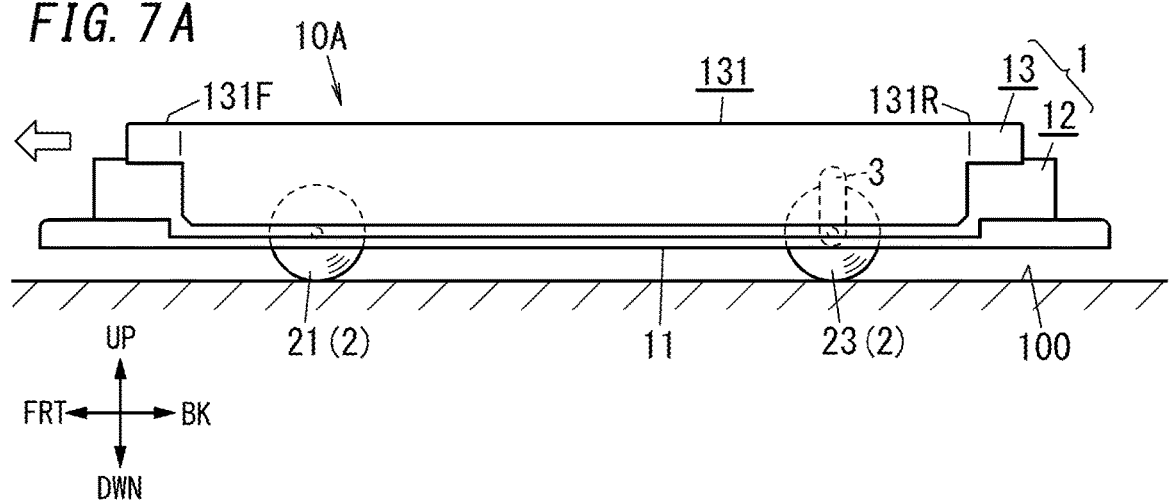
FIG. 7A is a side view illustrating a mover according to a second embodiment, of which a movable wheel is in the first state.
Figure 7B:
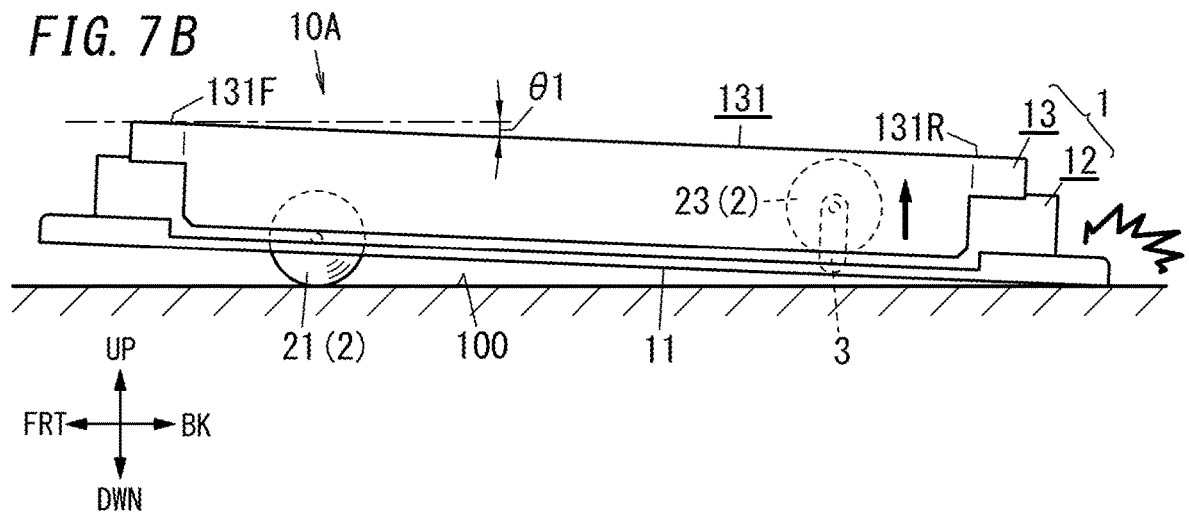
FIG. 7B is a side view illustrating the mover, of which the movable wheel is in the second state.

A mover 10A according to this embodiment is configured to have the load platform 131 tilted with respect to the traveling surface 100 as shown in FIGS. 7A and 7B when the friction braking mechanism 3 is activated, which is a major difference from the mover 10 according to the first embodiment. In the following description, any constituent member of this second embodiment having the same function as a counterpart of the first embodiment described above will be designated by the same reference numeral as that counterpart's, and a detailed description thereof will be omitted herein. FIGS. 7A and 7B schematically illustrate the configuration of the mover 10A.

In this embodiment, the body 1 has a first end and a second end at both ends of the load platform 131 in the traveling direction (forward/backward direction) thereof. Specifically, the first end faces forward in the traveling direction of the body 1, and the second end faces backward in the traveling direction of the body 1. In the example shown in FIG. 7A, the body 1 is supposed to be going forward. In that case, the first end is the front end 131F of the load platform 131 and the second end is the rear end 131R of the load platform 131.

When the state of the movable wheels is switched from the first state into the second state while the body 1 is going forward, the friction braking mechanism 3 has the load platform 131 tilted with respect to the traveling surface 100 by lowering the second end (i.e., the rear end 131R) by a longer distance than the first end (i.e., the front end 131F). That is to say, in the mover 10A according to this embodiment, when the friction braking mechanism 3 is activated, the load platform 131 comes to define a tilt angle θ1 with respect to the traveling surface 100 as shown in FIG. 7B. Specifically, while the friction braking mechanism 3 is not activated, the load platform 131 is parallel to the traveling surface 100, i.e., in horizontal position, as shown in FIG. 7A. When the friction braking mechanism 3 is activated in this state, the mover 10A switches the state of only the wheels 23 and 24, serving as the rear wheels, into the second state where the wheels do not protrude from the bottom surface 11, without moving the wheels 21 and 22 serving as the front wheels. This allows only the rear end 131R of the load platform 131 as the second end to be lowered, thus making the body 1 leaning backward to define a tilt angle θ1 with respect to the traveling surface 100.

Also, in this embodiment, the friction braking mechanism 3 has a selective switching mode of switching the state of only ones selected from the plurality of (e.g., four in this embodiment) movable wheels from the first state into the second state. That is to say, according to this embodiment, the wheels 21 and 22 serving as the front wheels and the wheels 23 and 24 serving as the rear wheels are all movable wheels, of which the state is switchable by the friction braking mechanism 3 from the first state into the second state, and vice versa. The friction braking mechanism 3 switches, when operating in the selective switching mode, the state of only ones selected from the wheels 21 and 22, serving as the front wheels, and the wheels 23 and 24, serving as the rear wheels, from the first state into the second state. Alternatively, the friction braking mechanism 3 may also switch, when operating in a normal mode, the state of all of the four wheels 21, 22, 23, and 24 into the second state as in the first embodiment to bring the entire bottom surface 11 into contact with the traveling surface 100. As can be seen, changing the operation mode of the friction braking mechanism 3 allows the area of contact between the bottom surface 11 and the traveling surface 100 to be changed, thus enabling adjustment of the braking force applied on the body 1.

Furthermore, the friction braking mechanism 3 may also choose the orientation in which the body 1 is tilted by selectively switching, depending on the direction of movement of the body 1, either the state of the wheels 21 and 22 serving as the front wheels or the state of the wheels 23 and 24 serving as the rear wheels into the second state. It is suitably determined by the control unit 6, depending on the direction of movement of the body 1, whether the wheels to be switched into the second state are the wheels 21 and 22 serving as the front wheels or the wheels 23 and 24 serving as the rear wheels. The direction of movement of the body 1 may be determined based on the result of detection by the sensing unit 7. Specifically, as in the example illustrated in FIGS. 7A and 7B, while the body 1 is going forward, the friction braking mechanism 3 suitably makes the body 1 leaning backward by switching the state of only the wheels 23 and 24 serving as the rear wheels into the second state.

On the other hand, while the body 1 is going backward, the friction braking mechanism 3 suitably makes the body 1 leaning forward by switching the state of only the wheels 21 and 22 serving as the front wheels into the second state. That is to say, while the body 1 is going backward, the first end is the rear end 131R of the load platform 131 and the second end is the front end 131F of the load platform 131. In that case, if the state of only the wheels 21 and 22 serving as the front wheels is switched into the second state, only the front end 131F of the load platform 131 as the second end is lowered, thus making the body 1 leaning forward.

The mover 10A according to the second embodiment described above is allowed, when the friction braking mechanism 3 is activated by an emergency stop operation to switch the state of the movable wheels from the first state into the second state, to have the load platform 131 tilted with respect to the traveling surface 100. In this case, the second end of the load platform 131, facing backward in the traveling direction of the body 1 (i.e., the rear end 131R in FIG. 7B), is lowered with respect to the first end of the load platform 131 facing forward in the traveling direction of the body 1 (i.e., the front end 131F in FIG. 7B). Thus, the mover 10A is allowed to reduce, even when the friction braking mechanism 3 is activated while the mover 10A is carrying the burden X1, the chances of the burden X1 moving forward in the traveling direction of the body 1 under inertial force. That is to say, tilting the load platform 131 makes the burden X1 on the load platform 131 leaning backward, thus reducing the chances of the burden X1 collapsing or falling forward.

FIGS. 8A and 8B illustrate a mover 10B according to a first variation of the second embodiment. FIGS. 8A and 8B schematically illustrate a configuration for the mover 10B. The mover 10B has sloped surfaces 111 at both ends of the bottom surface 11 of the body 1 in the traveling direction thereof. The rest of the bottom surface 11 other than the sloped surfaces 111 is parallel to the traveling surface 100 while the body 1 is traveling. Each of the sloped surfaces 111 defines a tilt angle θ2 with respect to the traveling surface 100 such that each sloped surface 111 slopes away from the traveling surface 100 toward an associated edge of the bottom surface 11 of the body 1 in the traveling direction thereof while the body 1 is traveling. This configuration allows, when the friction braking mechanism 3 is activated, the sloped surface 111 at the rear end 131R as the second end to be brought into plane contact with the traveling surface 100 as shown in FIG. 8B. This ensures a relatively large area of contact between the bottom surface 11 (i.e., the sloped surface 111) and the traveling surface 100 and also ensures relatively high frictional force between the bottom surface 11 and the traveling surface 100. If the direction of movement of the body 1 is fixed in one direction (e.g., toward the front end 131F), the sloped surface 111 may be provided for only one end, facing backward in the traveling direction of the body 1, of the bottom surface 11.

Figure 9A:
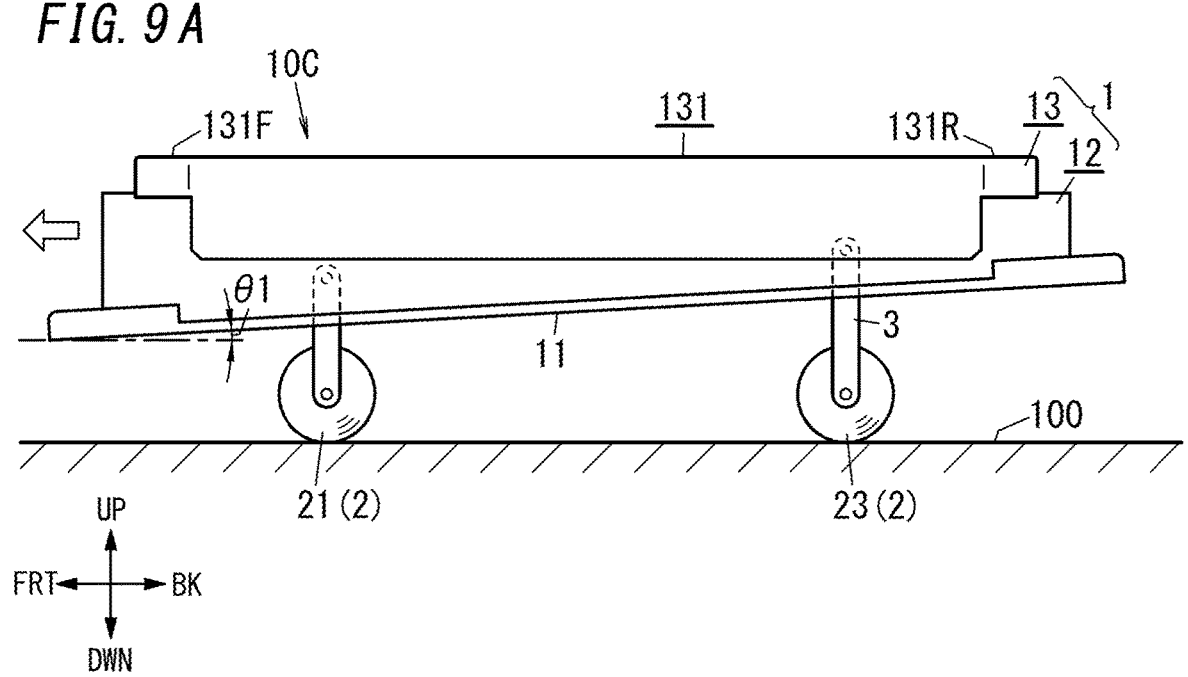
FIG. 9A is a side view illustrating a mover according to a second variation of the second embodiment, of which a movable wheel is in the first state.
Figure 9B:
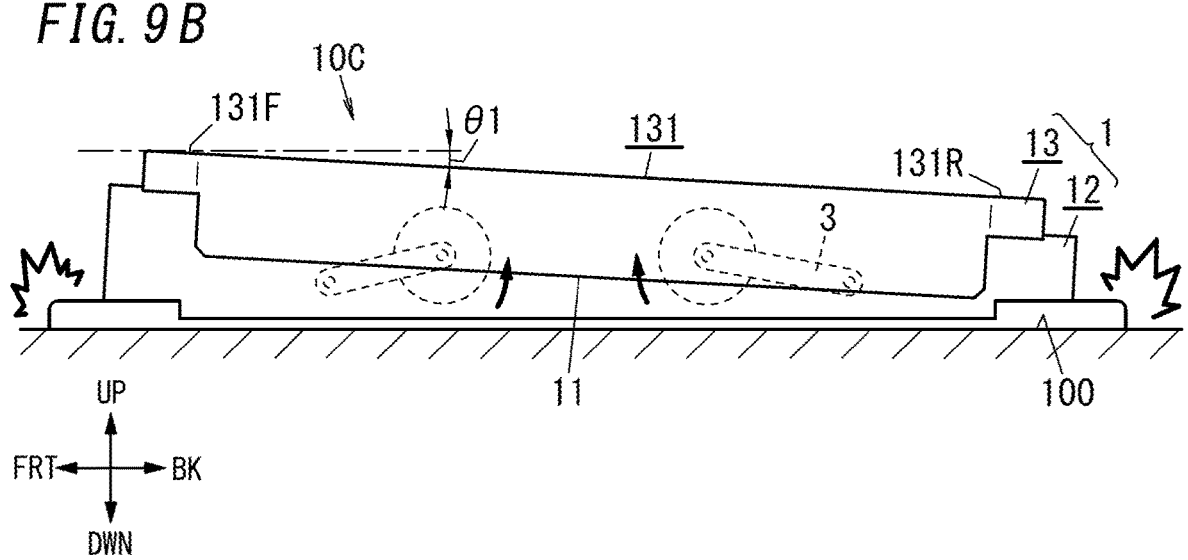
FIG. 9B is a side view illustrating the mover, of which the movable wheel is in the second state.

FIGS. 9A and 9B illustrate a mover 10C according to a second variation of the second embodiment. FIGS. 9A and 9B schematically illustrate a configuration for the mover 10C. In this mover 10C, while the body 1 is traveling, the bottom surface 11 of the body 1 is tilted with respect to the traveling surface 100. In this variation, the bottom surface 11 slopes away from the traveling surface 100 toward the rear end of the body 1 in the traveling direction thereof and defines an angle θ1 with respect to the traveling surface 100 while the body 1 is traveling. According to this configuration, lowering the second end (i.e., the rear end 131R) by a longer distance than the first end (i.e., the front end 131F) as shown in FIG. 9B while the friction braking mechanism 3 is activated allows the load platform 131 to define a tilt angle θ1 with respect to the traveling surface 100. This mover 10C may be configured to switch the state of all of the four wheels 21, 22, 23, and 24 into the second state by flipping these wheels 21, 22, 23, and 24 up toward the center of the body 1 to bring the entire bottom surface 11 into contact with the traveling surface 100.

Note that in the mover 10A described above, the load platform 131 does not have to be tilted with respect to the traveling surface 100 by lowering the second end (i.e., the rear end 131R) by a longer distance than the first end (i.e., the front end 13F) when the friction braking mechanism 3 is operating in the selective switching mode. For example, the first end (i.e., the front end 131F) may be lowered by a longer distance than the second end (i.e., the rear end 131R) by making the friction braking mechanism 3 operate in the selective switching mode while the body 1 is going forward, or the load platform 131 may define no tilt angle with respect to the traveling surface 100.

The configurations described for the second embodiment (including variations thereof) may be combined with the configurations described for the first embodiment (including variations thereof) as appropriate.

Third Embodiment

In a mover 10D according to a third embodiment, the friction braking mechanism 3 includes a movable member 14, protruding from the bottom surface 11 toward the traveling surface 100, as shown in FIGS. 10A and 10B, which is a major difference from the mover 10 of the first embodiment described above. In the following description, any constituent member of this third embodiment having the same function as a counterpart of the first embodiment described above will be designated by the same reference numeral as that counterpart's, and a detailed description thereof will be omitted herein. FIGS. 10A and 10B schematically illustrate the configuration of the mover 10D.

In this embodiment, the movable body is the movable member 14. The friction braking mechanism 3 is able to switch the state of the movable member 14 from a first state into a second state, and vice versa. The first state is a state where the movable member 14 has a protrusion height less than a reference value L11 (see FIG. 10A). The second state is a state where the movable member 14 has a protrusion height L12 (see FIG. 10B) equal to or greater than the reference value L11. The reference value L11 is represented by a height of the bottom surface 11 as measured from the traveling surface 100 while the body 1 is traveling. That is to say, the friction braking mechanism 3 switches the state of the movable member 14 from the first state into the second state, and vice versa, by moving the movable member 14 relative to the body 1. By switching the state of the movable member 14 from the first state into the second state while the body 1 is traveling, the friction braking mechanism 3 brings the movable member 14 into contact with the traveling surface 100 to apply a brake on the body 1.

Figure 12:
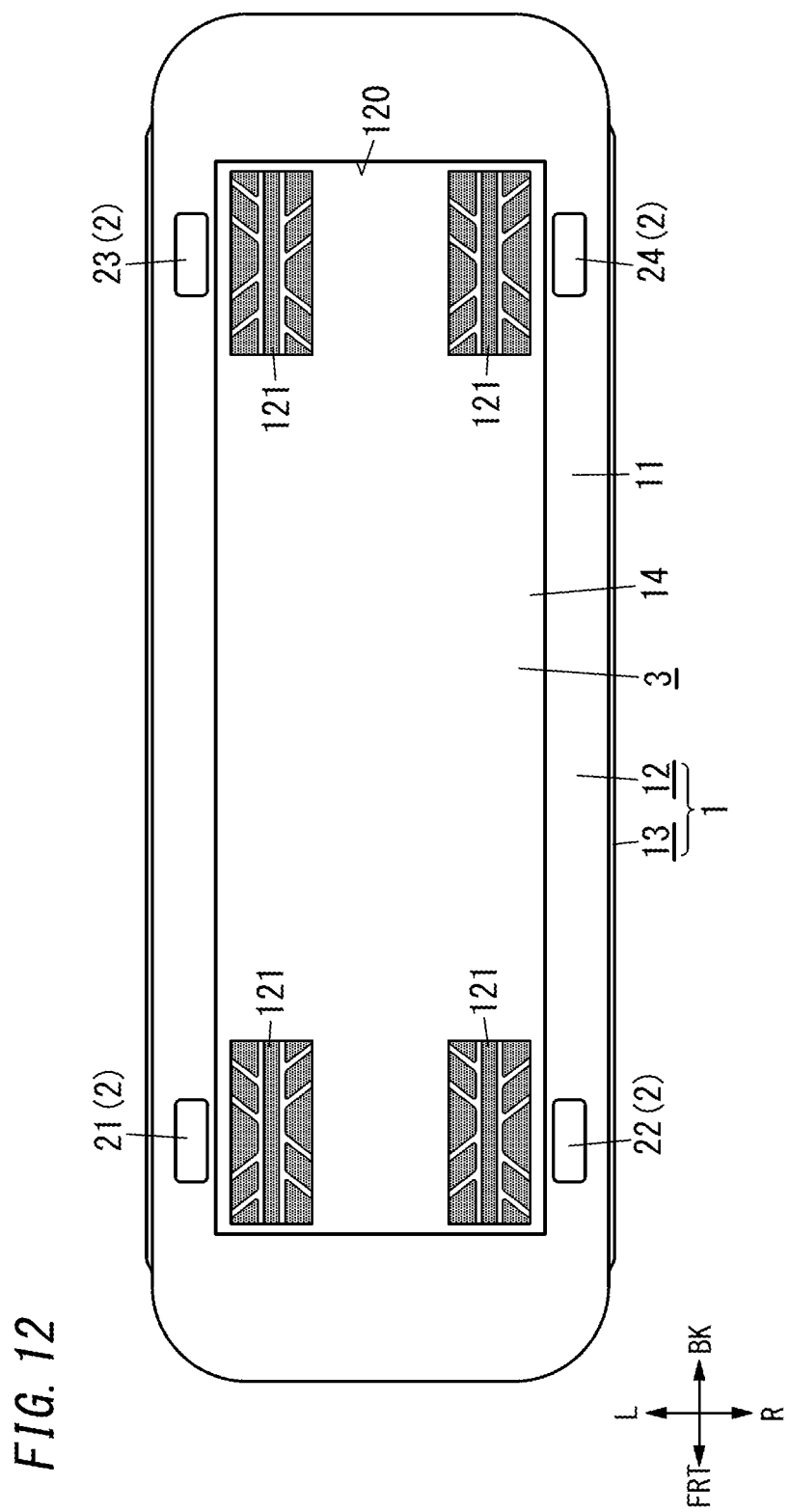
FIG. 12 is a bottom view of the mover.

In this embodiment, the body 1 has an opening 120 cut through the bottom surface 11 (i.e., the lower surface of the vehicle body 12) as shown in FIGS. 11A, 11B, and 12. The opening has the shape of a rectangle, of which the length (i.e., its dimension measured in the forward/backward direction) is greater than the width (i.e., its dimension measured in the rightward/leftward direction), and is arranged to be interposed between the four wheels 2 in the rightward/leftward direction. The opening 120 is a hole that allows the movable member 14 of the friction braking mechanism 3 to protrude or retract with respect to the bottom surface 11. Thus, the movable member 14 is exposed through the opening 120.

In this embodiment, the wheels 21, 22 serving as front wheels and the wheels 23, 24 serving as rear wheels are all drive wheels to be driven by the drive unit 4. Since the movable body is the movable member 14 in this embodiment, none of the wheels 21, 22 serving as front wheels and the wheels 23, 24 serving as rear wheels are movable wheels, of which the state is switched by the friction braking mechanism 3 between the first state and the second state.

The friction braking mechanism 3 includes the movable member 14 protruding from the bottom surface 11 of the body 1 toward the traveling surface 100 as described above. By switching the state of the movable member 14 from the first state into the second state while the body 1 is traveling, the friction braking mechanism 3 brings the movable member 14 into contact with the traveling surface 100 to apply a brake on the body 1. Suppose the height of the bottom surface 11 of the body 1 traveling as measured from the traveling surface 100 while the movable member 14 is in the first state is a reference value L11. The first state is a state where the movable member 14, protruding downward (i.e., toward the traveling surface 100) from the bottom surface 11 of the body 1, has a protrusion height less than the reference value L11 as shown in FIG. 10A. The second state is a state where the movable member 14, protruding downward (i.e., toward the traveling surface 100) from the bottom surface 11 of the body 1, has a protrusion height equal to or greater than the reference value L11 as shown in FIG. 10B. In this embodiment, switching the state of the movable member 14 from the first state into the second state brings the entire surface (lower surface), facing the traveling surface 100, of the movable member 14 into contact with the traveling surface 100 to apply a brake on the body 1. The friction braking mechanism 3 switches the state of the movable member 14 from the first state into the second state in response to an emergency stop signal supplied from the control unit 6. In addition, the friction braking mechanism 3 switches the state of the movable member 14 from the second state into the first state in response to a return signal supplied from the control unit 6.

The friction braking mechanism 3 is a mechanism configured to switch the state of the movable member 14 from the first state into the second state, and vice versa, by moving the movable member 14 relative to the body 1 such that the movable member 14 protrudes or retracts with respect to the bottom surface 11 of the body 1. The friction braking mechanism 3 is built in the vehicle body 12. In this embodiment, the movable member 14 in the first state is retracted in the body 1. Specifically, in the first state, the bottom surface 11 of the body 1 is flush with the surface (i.e., the lower surface), facing the traveling surface 100, of the movable member 14. Thus, in the first state, the movable member 14 does not protrude from the bottom surface 11 of the body 1, and has a protrusion height of zero. On the other hand, in the second state, the friction braking mechanism 3 allows the movable member 14 to protrude from the bottom surface 11 of the body 1. In this embodiment, the protrusion height L2 of the movable member 14 in the second state is greater than the reference value L11. Thus, switching the state of the movable member 14 from the first state into the second state allows the body 1 to be lifted in its entirety, including all of the plurality of wheels 2, thus making the plurality of wheels 2 uplifted by a distance L3 from the traveling surface 100 as shown in FIG. 10B. The protrusion height L12 of the movable member 14 in the second state is the sum of the reference value L11 and the distance L3 traveled upward by the wheels 2. The friction braking mechanism 3 may include an electric motor, for example, and may be implemented as any appropriate mechanism, such as a pantograph or rack-pinion mechanism, configured to allow the movable member 14 to move straight up and down under the driving force generated by the electric motor.

That is to say, in the first state where the protrusion height of the movable member 14 is less than the reference value L11, the body 1 is supported by the plurality of wheels 2, and a gap is left between the bottom surface 11 of the body 1 and the traveling surface 100 to make the bottom surface 11 out of contact with the traveling surface 100 as shown in FIG. 10A. On the other hand, in the second state where the protrusion height L12 of the movable member 14 is equal to or greater than the reference value L11, the movable member 14 is lowered relative to the body 1 to come into contact with the traveling surface 100 as shown in FIG. 10B. Thus, switching the state of the movable member 14 from the first state into the second state while the body 1 is traveling causes frictional force between at least a portion of the movable member 14 (the entire lower surface of the movable member 14 in this embodiment) and the traveling surface 100. This frictional force applies a brake on the body 1.

In the mover 10D of this exemplary embodiment, the movable member 14 includes a frictional resistance portion 121, which forms at least part of the surface, facing the traveling surface 100, of the movable member 14 as shown in FIG. 12. In this embodiment, a plurality of (e.g., four) frictional resistance portions 121 are provided. Each of these frictional resistance portions 121 is arranged between a centerline drawn to pass through the middle of the width of the surface, facing the traveling surface 100, of the movable member 14 and an associated one of the wheels 2. The frictional resistance portions 121 have a greater coefficient of friction with respect to the traveling surface 100 than the bottom surface 11 of the body 1 does. In other words, the coefficient of friction of the frictional resistance portions 121 with respect to the traveling surface 100 is greater than the coefficient of friction of the bottom surface 11 of the body 1 with respect to the traveling surface 100. In this embodiment, the frictional resistance portions 121 are implemented as sheets of synthetic rubber attached to the movable member 14. Such frictional resistance portions 121 have a greater coefficient of friction with respect to the traveling surface 100 than the bottom surface 11 of the body 1 does. Furthermore, in this embodiment, grooves with a predetermined pattern are cut on the surface of each frictional resistance portion 121. These grooves suitably have, just like grooves on car tires (i.e., a so-called "tread pattern"), the function of increasing the degree of close contact between the frictional resistance portion 121 and the traveling surface 100 by draining water from the gap between the surface of the frictional resistance portion 121 and the traveling surface 100.

Also, in this embodiment, the friction braking mechanism 3 switches the state of the movable member 14 from the first state into the second state when the drive unit 4 is deactivated. As used herein, the phrase "the drive unit 4 is deactivated" means that the drive unit 4 has become unable to transmit the driving force to the wheels 2, i.e., the driving force is cut off. That is to say, in case of emergency, such as when the supply of the power from the storage battery to the drive unit 4 is cut off or when a failure has occurred in the control unit 6, the friction braking mechanism 3 functions as an emergency brake to put a brake on the mover 10D. Specifically, the friction braking mechanism 3 makes an actuator such as a solenoid or electromagnetic valve maintain the movable member 14 in the first state while power is supplied from the storage battery. On the other hand, when the supply of the power from the storage battery is cut off, the actuator of the friction braking mechanism 3 is no longer able to maintain the movable member 14 in the first state. Then, the movable member 14 lowers itself relative to the body 1 under spring force applied by a spring member, for example, to switch into the second state. This allows the friction braking mechanism 3 to constitute a failsafe braking system to apply a brake on the mover 10D at least in case of emergency.

The mover 10D according to this embodiment operates (performs its basic operation and an emergency stop operation) in almost the same way as the mover 10 according to the first embodiment. That is to say, the flowchart shown in FIG. 6 corresponds to a method for controlling the mover 10D according to this embodiment. It should be noted, however, that the movable body for use in the emergency stop operation by the friction braking mechanism 3 according to this embodiment is not the movable wheels but the movable member 14. Thus, the method for controlling the mover 10D includes the processing step (i.e., S7 shown in FIG. 6) of bringing at least a portion of the bottom surface 11 into contact with the traveling surface 100 by switching, while the body 1 is traveling, the state of the movable member 14 from the first state into the second state to apply a brake on the body 1.

In short, when the state of the movable member 14 switches from the first state into the second state (in Step S7) by activating the friction braking mechanism 3 (in Step S6 shown in FIG. 6), the movable member 14 is lowered relative to the body 1. In this case, the distance traveled upward by the load platform 131 by switching the state of the movable member 14 from the first state into the second state is equal to the distance L3 traveled upward by the wheels 2. That is to say, the difference between the protrusion height L12 of the movable member 14 in the second state and the reference value L11 corresponds to the distance traveled upward by the load platform 131. Switching the state of the movable member 14 from the first state into the second state brings the movable member 14 into contact with the traveling surface 100 and causes frictional force between the movable member 14 and the traveling surface 100, thus applying a brake on the body 1 and bringing the body 1 to an emergency stop.

The third embodiment described above is only one of various embodiments of the present disclosure, and may be readily modified, changed, replaced, or combined with any other embodiments, depending on a design choice or any other factor, without departing from a true spirit and scope of the present disclosure. Also, the same function as that of the mover 10D according to the third embodiment may be implemented as a method for controlling the mover 10D, a (computer) program of controlling the mover 10D, or a non-transitory storage medium that stores the program thereon. A method for controlling the mover 10D according to an aspect is designed to switch, while a body 1 is traveling, a state of the movable member 14, protruding from the bottom surface 11 toward the traveling surface 100, from a first state into a second state. In this manner, a brake is applied on the body 1 with a movable member 14 brought into contact with the traveling surface 100. The mover 10D, which is the object of control, includes a plurality of wheels 2 and the body 1. The body 1 has the bottom surface 11. The body 1 is supported by the plurality of wheels 2 with the bottom surface 11 facing a traveling surface 100, and travels on the traveling surface 100 by turning the plurality of wheels 2. The first state is a state where the movable member 14 has a protrusion height less than a reference value L11, which is represented by a height of the bottom surface 11 as measured from the traveling surface 100. The second state is a state where the movable member 14 has a protrusion height L12 equal to or greater than the reference value L11. Next, variations of the third embodiment will be enumerated one after another. Optionally, any of the variations to be described below may be adopted in combination as appropriate.

The frictional resistance portions 121 do not have to be provided for only portions of the surface, facing the traveling surface 100, of the movable member 14 but may cover the entire surface, facing the traveling surface 100, of the movable member 14 as well. The grooves cut on the surface of the frictional resistance portions 121 are not essential to the mover 10D but may be omitted as appropriate.

In the embodiment described above, the bottom surface 11 is flush with the surface, facing the traveling surface 100, of the movable member 14 in the first state. However, this is only an exemplary configuration for the mover 10D and should not be construed as limiting. Alternatively, in the first state, the movable member 14 may protrude from the bottom surface 11. In that case, the surface, facing the traveling surface 100, of the movable member 14 is located under the bottom surface 11. Conversely, in the first state, the movable member 14 may be retracted with respect to the bottom surface 11. In that case, the surface, facing the traveling surface 100, of the movable member 14 is located over the bottom surface 11.

In the embodiment described above, the movable member 14 in the second state has a protrusion height L12 greater than the reference value L11. However, this is only an exemplary configuration for the mover 10D and should not be construed as limiting. Alternatively, in the second state, the movable member 14 may have a protrusion height L12 equal to the reference value L11. In that case, when the movable member 14 is in the second state, not only the movable member 14 but also the plurality of wheels 2 are in contact with the traveling surface 100.

Furthermore, in the embodiment described above, when the supply of the power from the storage battery is cut off, the friction braking mechanism 3 allows the movable member 14 to be lowered relative to the body 1 under the spring force applied by a spring member, for example. However, this is only an exemplary configuration for the mover 10D and should not be construed as limiting. Alternatively, when the sensing unit 7 detects that the drive unit 4 is deactivated, the friction braking mechanism 3 may be controlled by the control unit 6 to switch the state of the movable member 14 from the first state into the second state. Even in such an alternative embodiment, when the drive unit 4 is deactivated, the friction braking mechanism 3 is also able to switch the state of the movable member 14 from the first state into the second state.

Fourth Embodiment

Figure 13A:
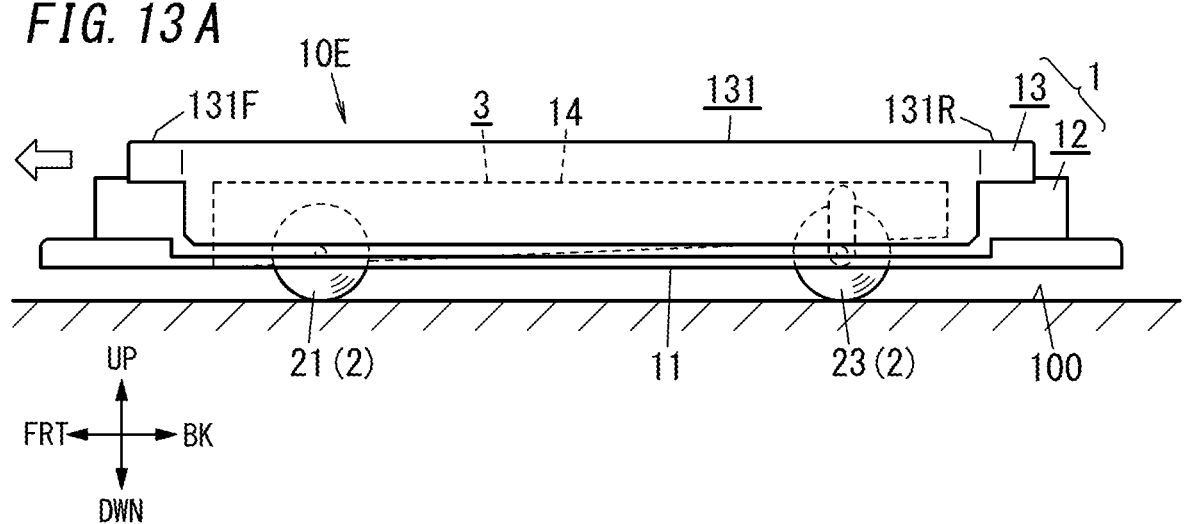
FIG. 13A is a side view illustrating a mover according to a fourth embodiment, of which a movable member is in the first state.
Figure 13B:
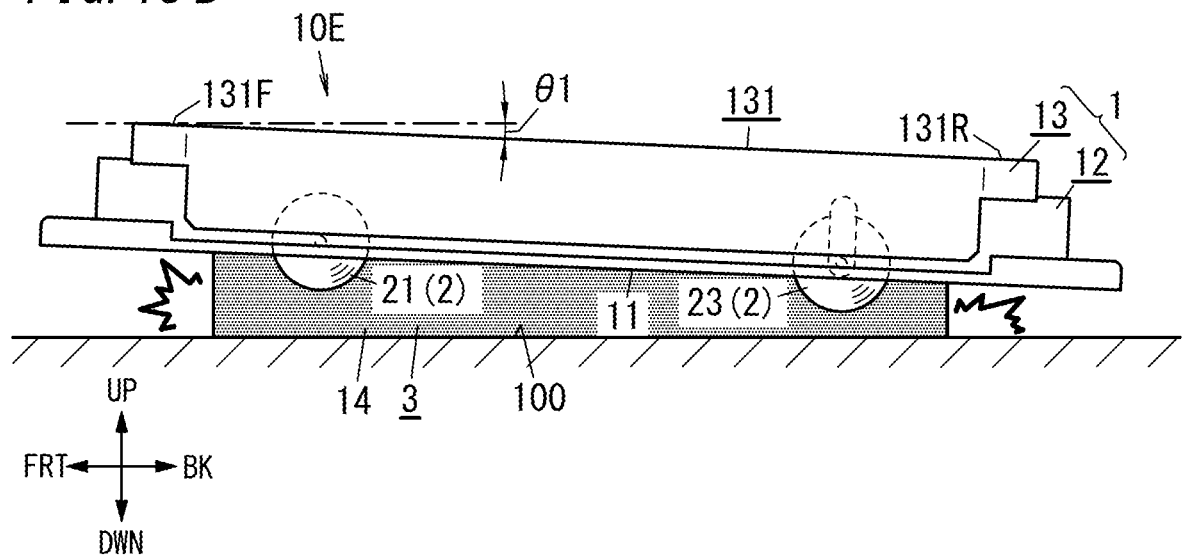
FIG. 13B is a side view illustrating the mover, of which the movable member is in the second state.

A mover 10E according to this embodiment is configured to have the load platform 131 tilted with respect to the traveling surface 100 as shown in FIGS. 13A and 13B when the friction braking mechanism 3 is activated, which is a major difference from the mover 10D according to the third embodiment. In the following description, any constituent member of this fourth embodiment having the same function as a counterpart of the third embodiment described above will be designated by the same reference numeral as that counterpart's, and a detailed description thereof will be omitted herein. FIGS. 13A and 13B schematically illustrate the configuration of the mover 10E.

In this embodiment, the body 1 has a first end and a second end at both ends of the load platform 131 in the traveling direction (forward/backward direction) thereof. Specifically, the first end faces forward in the traveling direction of the body 1, and the second end faces backward in the traveling direction of the body 1. In the example shown in FIG. 13A, the body 1 is supposed to be going forward. In that case, the first end is the front end 131F of the load platform 131 and the second end is the rear end 131R of the load platform 131.

When the state of the movable member 14 is switched from the first state into the second state while the body 1 is going forward, the friction braking mechanism 3 has the load platform 131 tilted with respect to the traveling surface 100 by elevating the second end (i.e., the rear end 131R) by a shorter distance than the first end (i.e., the front end 131F). That is to say, in the mover 10E according to this embodiment, when the friction braking mechanism 3 is activated, the load platform 131 comes to define a tilt angle θ1 with respect to the traveling surface 100 as shown in FIG. 13B. Specifically, while the friction braking mechanism 3 is not activated, the load platform 131 is parallel to the traveling surface 100, i.e., in horizontal position, as shown in FIG. 13A. When the friction braking mechanism 3 is activated in this state, the mover 10E switches the state of the movable member 14 into the second state to bring the surface (lower surface), facing the traveling surface 100, of the movable member 14 into contact with the traveling surface 100. In this embodiment, the lower surface of the movable member 14 is tilted with respect to the load platform 131. Specifically, the lower surface of the movable member 14 defines a tilt angle θ1 with respect to the load platform 131 so as to slope upward to the load platform 131 toward the rear end of the body 1 in the traveling direction thereof. Thus, the distance traveled upward by the rear end 131R of the load platform 131 as the second end becomes shorter than the distance traveled upward by the front end 131F thereof as the first end, thus making the body 1 leaning backward and tilted by the angle θ1 with respect to the traveling surface 100.

The mover 10E according to the fourth embodiment described above is allowed, when the friction braking mechanism 3 is activated by an emergency stop operation to switch the state of the movable member 14 from the first state into the second state, to have the load platform 131 tilted with respect to the traveling surface 100. In this case, the second end of the load platform 131, facing backward in the traveling direction of the body 1 (i.e., the rear end 131R in FIG. 13B), is lowered with respect to the first end of the load platform 131 facing forward in the traveling direction of the body 1 (i.e., the front end 131F in FIG. 13B). Thus, the mover 10E is still able to reduce, even when the friction braking mechanism 3 is activated while the mover 10E is carrying the burden X1, the chances of the burden X1 moving forward in the traveling direction of the body 1 under inertial force. That is to say, tilting the load platform 131 makes the burden X1 on the load platform 131 leaning backward, thus reducing the chances of the burden X1 collapsing or falling forward.

Figure 14A:
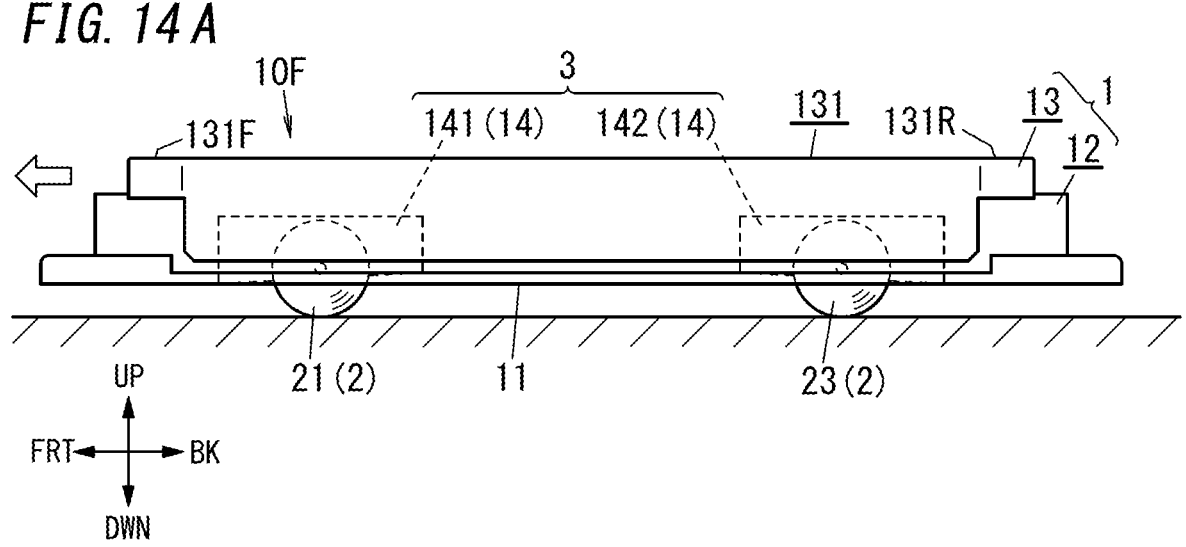
FIG. 14A is a side view illustrating a mover according to a first variation of the fourth embodiment, of which a movable member is in the first state.
Figure 14B:
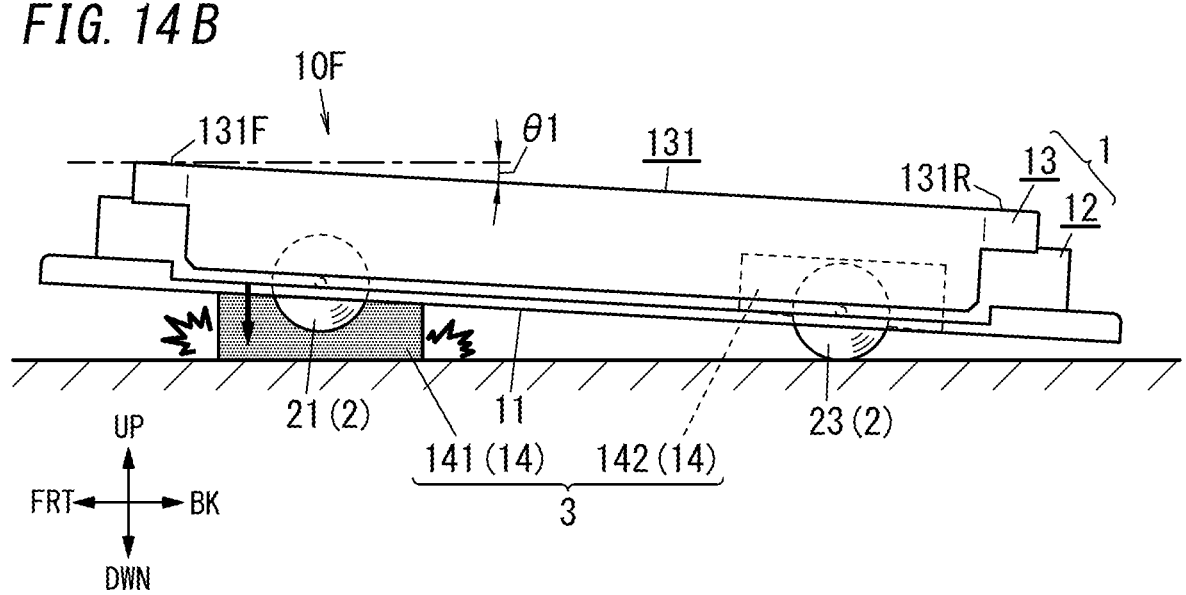
FIG. 14B is a side view illustrating the mover, of which the movable member is in the second state.

FIGS. 14A and 14B illustrate a mover 10F according to a variation of the fourth embodiment. FIGS. 14A and 14B schematically illustrate a configuration for the mover 10F. In this mover 10F, the friction braking mechanism 3 includes a plurality of movable members 141, 142. In the following description, if there is no need to distinguish these movable members 141, 142 from each other, the movable members 141, 142 will be collectively referred to as "movable members 14." The friction braking mechanism 3 has a selective switching mode of switching the state of only one(s) selected from the plurality of (e.g., two in this embodiment) movable members 14 from the first state into the second state. In this mover 10F, the friction braking mechanism 3 includes two movable members 141, 142 arranged in the traveling direction of the body 1 (i.e., in the forward/backward direction). The friction braking mechanism 3 switches, when operating in the selective switching mode, the state of either only the front movable member 141 or only the rear movable member 142, selected from the two movable members 141, 142, from the first state into the second state. Alternatively, the friction braking mechanism 3 may also switch, when operating in a normal mode, the state of both of the two movable members 141, 142 into the second state to bring both of the movable members 141, 142 into contact with the traveling surface 100. As can be seen, changing the operation mode of the friction braking mechanism 3 allows the area of contact between the movable members 14 and the traveling surface 100 to be changed, thus enabling adjustment of the braking force applied on the body 1.

Furthermore, the friction braking mechanism 3 may also choose the orientation in which the body 1 is tilted by selectively switching, depending on the direction of movement of the body 1, either the state of the front movable member 141 or the state of the rear movable member 142 into the second state. It is suitably determined by the control unit 6, depending on the direction of movement of the body 1, whether the movable member 14 to be switched into the second state is the front movable member 141 or the rear movable member 142. The direction of movement of the body 1 may be determined based on the result of detection by the sensing unit 7. Specifically, as in the example illustrated in FIGS. 14A and 14B, while the body 1 is going forward, the friction braking mechanism 3 suitably makes the body 1 leaning backward by switching the state of only the front movable member 141 into the second state.

On the other hand, while the body 1 is going backward, the friction braking mechanism 3 suitably makes the body 1 leaning forward by switching the state of only the rear movable member 142 into the second state. That is to say, while the body 1 is going backward, the first end is the rear end 131R of the load platform 131 and the second end is the front end 131F of the load platform 131. In that case, when the state of only the rear movable member 142 is switched into the second state, only the rear end 131R of the load platform 131 as the first end is elevated, thus making the body 1 leaning forward.

In this mover 10F, the lower surface of each movable member 14 is suitably tilted with respect to the load platform 131. Specifically, the lower surface of the movable member 141 suitably defines a tilt angle θ1 with respect to the load platform 131 so as to slope upward to the load platform 131 toward the rear end of the body 1. On the other hand, the lower surface of the movable member 142 suitably defines the tilt angle θ1 with respect to the load platform 131 so as to slope upward to the load platform 131 toward the front end of the body 1. This configuration allows, when the friction braking mechanism 3 is activated, the lower surface of the movable members 14 to be brought into plane contact with the traveling surface 100 as shown in FIG. 14B. This ensures a relatively large area of contact between the movable members 14 and the traveling surface 100 and also ensures relatively high frictional force between the movable members 14 and the traveling surface 100.

Note that in the mover 10F described above, the load platform 131 does not have to be tilted with respect to the traveling surface 100 by lowering the second end (i.e., the rear end 131R) by a longer distance than the first end (i.e., the front end 13F) when the friction braking mechanism 3 is operating in the selective switching mode. For example, the first end (i.e., the front end 131F) may be lowered by a longer distance than the second end (i.e., the rear end 131R) by making the friction braking mechanism 3 operate in the selective switching mode while the body 1 is going forward. Alternatively, the load platform 131 may define no tilt angle with respect to the traveling surface 100.

The configurations described for the fourth embodiment (including variations thereof) may be combined with the configurations described for the third embodiment (including variations thereof) as appropriate.

Note that the drawings referred to in the foregoing description of embodiments illustrate examples of the movers 10, 10A-10F only schematically, and may be somewhat different from actual implementations thereof in terms of the shapes, dimensions, positional relationships, and other parameters of their respective parts.

(Resume)

As can be seen from the foregoing description, a mover (10, 10A-10F) according to a first aspect includes a plurality of wheels (2), a body (1), and a friction braking mechanism (3). The body (1) has a bottom surface (11). The body (1) is supported by the plurality of wheels (2) with the bottom surface (11) facing a traveling surface (100) and configured to travel on the traveling surface (100) by turning the plurality of wheels (2). The friction braking mechanism (3) is configured to apply a brake on the body (1) with either at least a portion of the bottom surface (11) or at least a portion of a movable body brought into contact with the traveling surface (100) by switching, while the body (1) is traveling, a state of the movable body from a first state into a second state. The second state is a state where the movable body protrudes from the bottom surface (11) to a different height from in the first state.

This aspect allows, when the friction braking mechanism (3) is activated to switch the state of the movable body from the first state into the second state, a brake to be applied on the body (1) by bringing either at least a portion of the bottom surface (11) or at least a portion of the movable body into contact with the traveling surface (100), irrespective of the status of braking on the wheels (2). This allows, even in a situation where the traveling surface (100) is slippery for the wheels (2), the mover (10, 10A-10F) to have a shortened braking distance. Thus, the mover (10, 10A-10F) may have a shorter braking distance.

In a mover (10, 10A-10F) according to a second aspect, which may be implemented in conjunction with the first aspect, the plurality of wheels (2) includes at least one movable wheel. The movable body is the movable wheel. The friction braking mechanism (3) applies a brake on the body (1) with at least a portion of the bottom surface (11) brought into contact with the traveling surface (100) by switching, while the body (1) is traveling, a state of the movable wheel from the first state where the movable wheel protrudes from the bottom surface (11) into the second state where the movable wheel protrudes to a lesser protrusion height with respect to the bottom surface (11) than in the first state.

This aspect allows, when the friction braking mechanism (3) is activated to switch the state of the movable wheel from the first state into the second state, a brake to be applied on the body (1) by bringing the bottom surface (11) into contact with the traveling surface (100), irrespective of the status of braking on the wheels (2). This allows, even in a situation where the traveling surface (100) is slippery for the wheels (2), the mover (10, 10A-10F) to have a shortened braking distance. Thus, the mover (10, 10A-10F) may have a shorter braking distance.

In a mover (10, 10A-10F) according to a third aspect, which may be implemented in conjunction with the second aspect, the body (1) includes a frictional resistance portion (121) that forms at least part of the bottom surface (11). The frictional resistance portion (121) has a greater coefficient of friction with respect to the traveling surface (100) than any portion, other than the frictional resistance portion (121), of the surface of the body (1) does.

This aspect allows braking force applied on the body (1) to be increased when the frictional resistance portion (121) is brought into contact with the traveling surface (100) with the friction braking mechanism (3) activated.

In a mover (10, 10A-10F) according to a fourth aspect, which may be implemented in conjunction with the second aspect, the body (1) has a load platform (131) configured to be loaded with a burden (X1).

This aspect allows the mover (10, 10A-10F) to carry the burden (X1).

In a mover (10, 10A-10F) according to a fifth aspect, which may be implemented in conjunction with the fourth aspect, the body (1) further includes a lift-up mechanism (8). The lift-up mechanism (8) is configured to lift the burden (X1) by elevating the load platform (131). When the state of the movable wheel is switched from the first state into the second state, a distance (L1) traveled downward by the load platform (131) is shorter than a distance (L2) traveled upward by the burden (X1) lifted by the lift-up mechanism (8).

This aspect prevents, even if the friction braking mechanism (3) is activated, the burden (X1) from coming into contact with the traveling surface (100), because the burden (X1) being carried is elevated by the distance (L2) from the traveling surface (100). This reduces the chances of the burden (X1) continuing to move under the inertial force while the friction braking mechanism (3) is activated.

In a mover (10, 10A-10F) according to a sixth aspect, which may be implemented in conjunction with the fourth or fifth aspect, the body (1) has a first end (front end 131F) and a second end (rear end 131R) at both ends of the load platform (131) in its traveling direction. When the state of the movable wheel is switched from the first state into the second state while the body (1) is traveling with the first end of the body (1) facing forward in the traveling direction, the friction braking mechanism (3) lowers the second end by a longer distance than the first end to have the load platform (131) tilted with respect to the traveling surface (100).

This aspect allows, when the friction braking mechanism (3) is activated, the burden (X1) loaded on the load platform (131) to be leaned backward by tilting the load platform (131). This reduces the chances of the burden (X1) collapsing or falling down.

In a mover (10, 10A-10F) according to a seventh aspect, which may be implemented in conjunction with the first aspect, the friction braking mechanism (3) includes a movable member (14) protruding from the bottom surface (11) toward the traveling surface (100). The movable body is the movable member (14). The friction braking mechanism (3) applies a brake on the body (1) with the movable member (14) brought into contact with the traveling surface (100) by switching, while the body (1) is traveling, a state of the movable member (14) from a first state into a second state. The first state is a state where the movable member (14) has a protrusion height less than a reference value (L11). The second state is a state where the movable member (14) has a protrusion height (L12) equal to or greater than the reference value (L11). The reference value (L11) is represented by a height of the bottom surface (11) as measured from the traveling surface (100).

This aspect allows, when the friction braking mechanism (3) is activated to switch the state of the movable member (14) from the first state into the second state, a brake to be applied on the body (1) by bringing the movable member (14) into contact with the traveling surface (100), irrespective of the status of braking on the wheels (2). This allows, even in a situation where the traveling surface (100) is slippery for the wheels (2), the mover (10, 10A-10F) to have a shortened braking distance. Thus, the mover (10, 10A-10F) may have a shorter braking distance.

In a mover (10, 10A-10F) according to an eighth aspect, which may be implemented in conjunction with the seventh aspect, the movable member (14) includes a frictional resistance portion (121) that forms at least part of a surface thereof facing the traveling surface (100). The frictional resistance portion (121) has a greater coefficient of friction with respect to the traveling surface (100) than the bottom surface (11) does.

This aspect allows braking force applied on the body (1) to be increased when the frictional resistance portion (121) is brought into contact with the traveling surface (100) with the friction braking mechanism (3) activated.

In a mover (10, 10A-10F) according to a ninth aspect, which may be implemented in conjunction with the seventh or eighth aspect, the body (1) has a load platform (131) configured to be loaded with a burden (X1).

This aspect allows the mover (10, 10A-10F) to carry the burden (X1).

In a mover (10, 10A-10F) according to a tenth aspect, which may be implemented in conjunction with the ninth aspect, the body (1) further includes a lift-up mechanism (8). The lift-up mechanism (8) is configured to lift the burden (X1) by elevating the load platform (131).

This aspect allows the burden (X1) to be lifted and carried.

In a mover (10, 10A-10F) according to an eleventh aspect, which may be implemented in conjunction with the ninth or tenth aspect, the body (1) has a first end (front end 131F) and a second end (rear end 131R) at both ends of the load platform (131) in its traveling direction. When the state of the movable member (14) is switched from the first state into the second state while the body (1) is traveling with the first end of the body (1) facing forward in the traveling direction, the friction braking mechanism (3) elevates the second end by a shorter distance than the first end to have the load platform (131) tilted with respect to the traveling surface (100).

This aspect allows, when the friction braking mechanism (3) is activated, the burden (X1) loaded on the load platform (131) to be leaned backward by tilting the load platform (131). This reduces the chances of the burden (X1) collapsing or falling down.

A mover (10, 10A-10F) according to a twelfth aspect, which may be implemented in conjunction with any one of the first to eleventh aspects, further includes a wheel braking mechanism (5). The wheel braking mechanism (5) is configured to apply a brake on a braking wheel that is at least one of the plurality of wheels (2).

This aspect allows a brake to be applied on the body (1) by the wheel braking mechanism (5) in a steady state and by the friction braking mechanism (3) in case of emergency, for example.

A mover (10, 10A-10F) according to a thirteenth aspect, which may be implemented in conjunction with the twelfth aspect, further includes a control unit (6). The control unit (6) is configured to switch the state of the movable body from the first state into the second state by activating the friction braking mechanism (3) when a predetermined condition is satisfied while the wheel braking mechanism (5) is activated.

This allows, if the braking force applied by the wheel braking mechanism (5) is insufficient even though the wheel braking mechanism (5) is activated, for example, a brake to be applied on the body (1) by activating the friction braking mechanism (3).

In a mover (10, 10A-10F) according to a fourteenth aspect, which may be implemented in conjunction with the thirteenth aspect, the control unit (6) determines, based on correlation between a status of activation of the wheel braking mechanism (5) and a behavior of the body (1), whether or not the predetermined condition is satisfied.

This aspect allows, if the behavior of the body (1) is contradictory to the status of activation of the wheel braking mechanism (5) (e.g., when the behavior of the body (1) does not indicate that deceleration is equal to or greater than a predetermined value even though the wheel braking mechanism (5) is activated), a brake to be applied on the body (1) by activating the friction braking mechanism (3).

In a mover (10, 10A-10F) according to a fifteenth aspect, which may be implemented in conjunction with the thirteenth or fourteenth aspect, the control unit (6) determines, based on a status of braking on the braking wheel, whether or not the predetermined condition is satisfied.

This aspect allows, if the status of braking on the braking wheel indicates an abnormality that the braking wheel is locked, for example, a brake to be applied on the body (1) by activating the friction braking mechanism (3).

In a mover (10, 10A-10F) according to a sixteenth aspect, which may be implemented in conjunction with any one of the thirteenth to fifteenth aspects, the control unit (6) determines, by comparing a mandatory stop distance with a braking distance of the body when the wheel braking mechanism (5) is activated, whether or not the predetermined condition is satisfied. The mandatory stop distance is a distance from a mandatory stop position on the traveling surface (100) to the body (1).

This aspect allows, if the body (1) fails to stop completely before the mandatory stop position, for example, a brake to be applied on the body (1) by activating the friction braking mechanism (3).

A mover (10, 10A-10F) according to a seventeenth aspect, which may be implemented in conjunction with any one of the first to sixteenth aspects, further includes a drive unit (4). The drive unit (4) is configured to apply driving force either directly or indirectly to a drive wheel that is at least one of the plurality of wheels (2). The friction braking mechanism (3) switches the state of the movable body from the first state into the second state when the drive unit (4) is deactivated.

This aspect allows the friction braking mechanism (3) to serve as a failsafe braking system for applying a brake on the mover (10) at least in case of emergency.

In a mover (10, 10A-10F) according to an eighteenth aspect, which may be implemented in conjunction with any one of the first to seventeenth aspects, the movable body includes a plurality of movable bodies. The friction braking mechanism (3) has a selective switching mode in which the state is switched from the first state into the second state for only some movable body selected from the plurality of movable bodies.

This aspect allows the area of contact between the bottom surface (11) or the movable body and the traveling surface (100) to be changed by switching the state from the first state into the second state for only ones selected from the plurality of movable bodies. This enables adjustment of braking force applied on the body (1).

A method for controlling a mover (10, 10A-10F) according to a nineteenth aspect is designed to switch, while the body (1) is traveling, a state of the movable wheel from a first state into a second state. In this manner, according to this method for controlling the mover (10, 10A-10F), a brake is applied on the body (1) with at least a portion of the bottom surface (11) brought into contact with the traveling surface (100). The first state is a state where the movable wheel protrudes from the bottom surface (11). The second state is a state where the movable wheel protrudes to a lesser protrusion height with respect to the bottom surface (11) than in the first state. The mover (10, 10A-10F) includes a plurality of wheels (2) and the body (1). The plurality of wheels (2) includes at least one movable wheel. The body (1) has a bottom surface (11). The body (1) is supported by the plurality of wheels (2) with the bottom surface (11) facing a traveling surface (100), and configured to travel on the traveling surface (100) by turning the plurality of wheels (2).

This aspect allows, when the state of the movable wheel switches from the first state into the second state, a brake to be applied on the body (1) by bringing the bottom surface (11) into contact with the traveling surface (100), irrespective of the status of braking on the wheels (2). This allows, even in a situation where the traveling surface (100) is slippery for the wheels (2), the mover (10, 10A-10F) to have a shortened braking distance. Thus, this method for controlling the mover (10, 10A-10F) allows the mover (10, 10A-10F) to have a shorter braking distance.

A method for controlling a mover (10, 10A-10F) according to a twentieth aspect is designed to switch, while a body (1) is traveling, a state of the movable member (14) from a first state into a second state. In this manner, according to this method for controlling the mover (10, 10A-10F), a brake is applied on the body (1) with a movable member (14) brought into contact with the traveling surface (100). The movable member (14) protrudes from the bottom surface (11) toward the traveling surface (100). The first state is a state where the movable member (14) has a protrusion height less than a reference value (L11). The second state is a state where the movable member (14) has a protrusion height (L12) equal to or greater than the reference value (L11). The reference value (L11) is represented by a height of the bottom surface (11) as measured from the traveling surface (100). The mover (10, 10A-10F) includes a plurality of wheels (2) and the body (1). The body (1) has the bottom surface (11). The body (1) is supported by the plurality of wheels (2) with the bottom surface (11) facing a traveling surface (100), and configured to travel on the traveling surface (100) by turning the plurality of wheels (2).

This aspect allows, when the state of the movable member (14) switches from the first state into the second state, a brake to be applied on the body (1) by bringing the movable member (14) into contact with the traveling surface (100), irrespective of the status of braking on the wheels (2). This allows, even in a situation where the traveling surface (100) is slippery for the wheels (2), the mover (10, 10A-10F) to have a shortened braking distance. Thus, this method for controlling the mover (10, 10A-10F) allows the mover (10, 10A-10F) to have a shorter braking distance.

Note that these aspects are only exemplary aspects of the present disclosure. That is to say, the present disclosure has many other aspects that have not been mentioned above. For example, various configurations of the mover (10, 10A-10F) according to the first to fourth embodiments described above may also be implemented as a method for controlling the mover (10, 10A-10F) in a different way, a program for controlling the mover, and a non-transitory storage medium that stores the program thereon.

Note that the configurations according to the second to eighteenth aspects are not essential constituent elements of the mover (10, 10A-10F) but may be omitted as appropriate.

The invention claimed is:

1. A mover comprising:
a plurality of wheels including a movable wheel with a vertically translatable rotation axis;
a body having a bottom surface, the body being supported by the plurality of wheels with the bottom surface facing a traveling surface and configured to travel on the traveling surface by turning the plurality of wheels; and
a friction braking mechanism configured to
apply a brake on the body with at least a portion of the bottom surface brought into contact with the traveling surface by switching, while the body is traveling, a state of the movable wheel from a first state into a second state by translating the vertically translatable rotation axis, the second state being a state where the movable wheel protrudes from the bottom surface to a different height than in the first state, wherein
the friction braking mechanism applies a brake on the body with at least a portion of the bottom surface brought into contact with the traveling surface by switching, while the body is traveling, a state of the movable wheel from the first state where the movable wheel protrudes from the bottom surface into the second state where the movable wheel protrudes to a lesser protrusion height with respect to the bottom surface than in the first state,
the body has a load platform configured to be loaded with a burden,
the body has a first end and a second end at both ends of the load platform in its traveling direction, and
when the state of the movable wheel is switched from the first state into the second state while the body is traveling with the first end of the body facing forward in the traveling direction, the friction braking mechanism lowers the second end by a longer distance than the first end to have the load platform tilted with respect to the traveling surface.

2. The mover of claim 1, wherein
the body includes a frictional resistance portion that forms at least part of the bottom surface, and
the frictional resistance portion has a greater coefficient of friction with respect to the traveling surface than any portion, other than the frictional resistance portion, of the bottom surface of the body does.

3. The mover of claim 1, wherein
the body further includes a lift-up mechanism configured to lift the burden by elevating the load platform, and
when the state of the movable wheel is switched from the first state into the second state, a distance traveled downward by the load platform is shorter than a distance traveled upward by the burden lifted by the lift-up mechanism.

4. The mover of claim 1, further comprising a wheel braking mechanism configured to apply a brake on a braking wheel that is at least one of the plurality of wheels.

5. The mover of claim 4, further comprising a control unit configured to switch the state of the movable wheel from the first state into the second state by activating the friction braking mechanism when a predetermined condition is satisfied while the wheel braking mechanism is activated.

6. The mover of claim 5, wherein
the control unit determines, based on correlation between a status of activation of the wheel braking mechanism and a behavior of the body, whether or not the predetermined condition is satisfied.

7. The mover of claim 5, wherein
the control unit determines, based on a status of braking on the braking wheel, whether or not the predetermined condition is satisfied.

8. The mover of claim 5, wherein
the control unit determines, by comparing a distance from a mandatory stop position on the traveling surface to the body with a braking distance of the body when the wheel braking mechanism is activated, whether or not the predetermined condition is satisfied.

9. The mover of claim 1, further comprising a drive unit configured to apply driving force either directly or indirectly to a drive wheel that is at least one of the plurality of wheels, wherein
the friction braking mechanism switches the state of the movable wheel from the first state into the second state when the drive unit is deactivated.

10. The mover of claim 1, wherein
the mover includes a plurality of movable wheels, and
the friction braking mechanism has a selective switching mode in which the state is switched from the first state into the second state for only one movable wheel or more wheels selected from the plurality of movable wheels.

11. A method for controlling a mover, the mover including:
a plurality of wheels including at least one movable wheel with a vertically translatable rotation axis; and
a body having a bottom surface, the body being supported by the plurality of wheels with the bottom surface facing a traveling surface, and configured to travel on the traveling surface by turning the plurality of wheels;
the body has a load platform configured to be loaded with a burden; and
the body has a first end and a second end at both ends of the load platform in its traveling direction, the method comprising:
- applying a brake on the body with at least a portion of the bottom surface brought into contact with the traveling surface by switching, while the body is traveling, a state of the movable wheel from a first state where the movable wheel protrudes from the bottom surface into a second state where the movable wheel protrudes to a lesser protrusion height with respect to the bottom surface than in the first state by translating the vertically translatable rotation axis, and
- lowering the second end by a longer distance than the first end to have the load platform tilted with respect to the traveling surface when the state of the movable wheel is switched from the first state into the second state while the body is traveling with the first end of the body facing forward in the traveling direction.

\* \* \* \* \*